(12) United States Patent
Kim

(10) Patent No.: US 11,835,268 B2
(45) Date of Patent: Dec. 5, 2023

(54) UNDERGROUND HEAT EXCHANGE TYPE COOLING AND HEATING SYSTEM

(71) Applicant: INTERTECH Co., Ltd., Jeju-si (KR)

(72) Inventor: Jong Woo Kim, Jeju-si (KR)

(73) Assignee: INTERTECH Co., Ltd., Jeju-si (KR)

( * ) Notice: Subject to any disclaimer, the term of this patent is extended or adjusted under 35 U.S.C. 154(b) by 468 days.

(21) Appl. No.: 17/100,366

(22) Filed: Nov. 20, 2020

(65) Prior Publication Data

US 2021/0071915 A1  Mar. 11, 2021

Related U.S. Application Data

(63) Continuation of application No. PCT/KR2018/014382, filed on Nov. 21, 2018.

(30) Foreign Application Priority Data

Aug. 23, 2018 (KR) .......................... 10-2018-0098610

(51) Int. Cl.
*F24F 5/00* (2006.01)
*F24T 10/10* (2018.01)
(Continued)

(52) U.S. Cl.
CPC ............ *F24T 10/15* (2018.05); *F24F 5/0046* (2013.01)

(58) Field of Classification Search
CPC ........... F24D 2200/11; F25B 2313/002; Y02E 10/10; F24T 10/10; F24T 10/13;
(Continued)

(56) References Cited

U.S. PATENT DOCUMENTS

| 5,054,541 A * | 10/1991 | Tripp | F24T 10/10 |
| | | | 165/45 |
| 2005/0061472 A1* | 3/2005 | Guynn | F24T 10/15 |
| | | | 165/104.11 |

(Continued)

FOREIGN PATENT DOCUMENTS

| KR | 10-0894297 B1 | 4/2009 |
| KR | 10-2009-0128722 A | 12/2009 |

(Continued)

OTHER PUBLICATIONS

International Search Report issued in PCT/KR2018/014382; dated May 21, 2019.

*Primary Examiner* — Frantz F Jules
*Assistant Examiner* — Jason N Thompson
(74) *Attorney, Agent, or Firm* — Studebaker & Brackett PC

(57) ABSTRACT

An underground heat exchange type cooling and heating system includes an underground heat exchange device to allow heat to be exchanged between a first heat medium and a geothermal heat; a plurality of cooling and heating units which cools or heats an indoor space by means of a second heat medium; a plurality of heat pump units which allows heat to be exchanged between the first heat medium and the second heat medium; a first transfer line which transmits the first heat medium to the plurality of heat pump units and transmits the first heat medium having undergone heat exchange in the plurality of heat pump units to the underground heat exchange device; and a second transfer line which transmits the second heat medium to the plurality of cooling and heating units.

9 Claims, 25 Drawing Sheets

(51) Int. Cl.
*F24T 10/13* (2018.01)
*F24T 10/15* (2018.01)
*F24T 10/17* (2018.01)

(58) Field of Classification Search
CPC ... F24T 10/15; F24T 10/17; F24F 2005/0057; F24F 5/0046
See application file for complete search history.

(56) References Cited

U.S. PATENT DOCUMENTS

| | | | |
|---|---|---|---|
| 2005/0211437 A1* | 9/2005 | McNair | E21B 43/10 166/380 |
| 2010/0043461 A1* | 2/2010 | Pan | F24F 1/022 62/260 |
| 2011/0108233 A1* | 5/2011 | Wildig | F24D 11/0207 165/45 |
| 2011/0167819 A1* | 7/2011 | Lakic | H02K 7/1823 60/641.2 |
| 2011/0284207 A1* | 11/2011 | Pullman | E21B 7/20 166/85.1 |
| 2014/0096860 A1* | 4/2014 | Yang | F16L 59/02 138/149 |
| 2018/0073778 A1* | 3/2018 | Lee | F28F 1/34 |
| 2020/0049381 A1* | 2/2020 | Thielmann | F24T 10/40 |

FOREIGN PATENT DOCUMENTS

| | | |
|---|---|---|
| KR | 10-0931705 B1 | 12/2009 |
| KR | 10-0940810 B1 | 2/2010 |
| KR | 10-1124358 B1 | 3/2012 |
| KR | 10-1403687 B1 | 6/2014 |
| KR | 10-1431193 B1 | 8/2014 |
| KR | 10-1670082 B1 | 10/2016 |
| KR | 10-1775024 B1 | 9/2017 |
| KR | 10-2018-0073733 A | 7/2018 |

* cited by examiner a-a Cross-sectional view b-b Cross-sectional view c-c Cross-sectional view

UNDERGROUND HEAT EXCHANGE TYPE COOLING AND HEATING SYSTEM

CROSS-REFERENCE TO RELATED APPLICATIONS

The present application is a continuation of International Patent Application No. PCT/KR2018/014382, filed on Nov. 21, 2018, which is based upon and claims the benefit of priority to Korean Patent Application No. 10-2018-0098610 filed on Aug. 23, 2018. The disclosures of the above-listed applications are hereby incorporated by reference herein in their entirety.

TECHNICAL FIELD

The present invention relates to an underground heat exchange type cooling and heating system, and more particularly, to an underground heat exchange type cooling and heating system which is capable of supplying a heat source with a predetermined temperature to a cooling and heating device by performing heat-exchange of a heat medium required to cool and heat using a heat medium having undergone heat exchange by an underground heat exchange device.

BACKGROUND ART

In general, fossil fuels such as coal, petroleum, and natural gas are used as energy sources used for home and industry, and these fossil fuels are rapidly increasing in cost due to depletion of reserves. In addition, the water pollution and the air pollution are caused due to various pollutants generated during the combustion process of fossil fuels. Due to this problem, in recent years, the development of eco-friendly alternative energy that can replace fossil fuels is actively progressing.

The eco-friendly alternative energy includes solar heat, wind power, tidal power, geothermal heat, and the like. Among them, a cooling and heating system using geothermal heat may save the energy up to 40% or more compared to the existing cooling and heating systems and unlike wind power and solar heat, geothermal heat can maintain a constant temperature throughout the year, which allows a stable operation. Therefore, the interest in the geothermal heat is being increased.

Generally, a cooling and heating system using geothermal heat as a heat source includes an underground heat exchange device designed to return heat of a temperature of 10 to 20° C. from the ground or discharge heat to the ground and a heat pump connected thereto to perform the cooling and heating. In the underground heat exchange device, a heat medium is filled to be circulated along a pipeline to exchange heat with the underground. Accordingly, various technologies for improving a heat exchange efficiency of the underground heat exchange device are being developed.

FIG. 1 is a view schematically illustrating an underground heat exchange device of the related art.

Referring to FIG. 1, the underground heat exchange device 10 of the related art is inserted into a hole 1 which is drilled with a predetermined depth along a vertical direction from the ground. Generally, the underground heat exchange device 10 is configured by an inlet pipe 11 through which the heat medium flows in, an outlet pipe 12 through which the heat medium flows out, and a connection unit 13 which connects the inlet pipe 11 and the outlet pipe 12.

The underground heat exchange device 10 of the related art as described above adopts a method of extending a circulation path of the heat medium as a method for maximizing the heat exchange efficiency during the circulation of the heat medium. Specifically, the underground heat exchange device 10 of the related art forms an outlet pipe 12 to have a spiral shape so that the heat medium flowing in the inlet pipe 11 rises to a ground surface along the outlet pipe 12 to sufficiently exchange heat with soil or groundwater.

However, in the underground heat exchange device 10 of the related art, the inlet pipe 11 and the outlet pipe 12 which circulate the heat medium are integrally formed so that it is not easy to manufacture the underground heat exchange device. Further, due to the limited length that can be practically manufactured, when the underground heat exchange device is installed in the ground, sufficient heat exchange cannot be achieved. Further, in addition to being difficult to carry and install, if a defect occurs in a part of the inlet pipe 11 and the outlet pipe 12, the entire device needs to be replaced, so that the maintenance is not easy and a lot of costs is necessary.

DISCLOSURE

Technical Problem

The present invention is contrived to solve the above-described problem and an object of the present invention is to provide an underground heat exchange type cooling and heating system which maximizes a heat exchange efficiency using a reverse-return type module underground heat exchange device and stably supplies a heat medium having undergone heat exchange to a predetermined temperature to a plurality of cooling and heating units.

Technical problems of the present invention are not limited to the above-mentioned technical problems, and other technical problems, which are not mentioned above, can be clearly understood by those skilled in the art from the following descriptions.

Technical Solution

In order to solve the above-described problems, an underground heat exchange type cooling and heating system according to an embodiment of the present invention includes: an underground heat exchange device which is buried under the ground to allow heat to be exchanged between a first heat medium flowing therein and a geothermal heat; a plurality of cooling and heating units which cools or heats an indoor space by means of a second heat medium flowing therein; a plurality of heat pump units which allows heat to be exchanged between the first heat medium and the second heat medium to change the second heat medium to have a setting temperature for cooling or heating and individually performs a cooling or heating operation; a first transfer line which transmits the first heat medium having undergone heat exchange in the underground heat exchange device to the plurality of heat pump units and transmits the first heat medium having undergone heat exchange in the plurality of heat pump units to the underground heat exchange device; and a second transfer line which transmits the second heat medium having undergone heat exchange in the plurality of heat pump units to the plurality of cooling and heating units and transmits the second heat medium discharged from the plurality of cooling and heating units to the plurality of heat pump units.

The underground heat exchange device includes: a supply pipe which is connected to the first transfer line to supply the first heat medium from the outside to the underground; a reverse pipe in which the first heat medium having undergone heat exchange is collected; a heat exchange pipe which spirally formed to have at least one mountain portion along a length direction of the supply pipe to connect the supply pipe and the reverse pipe to each other and guide the movement of the first heat medium supplied through the supply pipe to exchange heat of the first heat medium to flow the first heat medium into the reverse pipe; a return pipe which is connected to the reverse pipe and the first transfer line to discharge the first heat medium having undergone heat exchange from the underground to the outside; and an interval maintaining member which is disposed along a length direction of the heat exchange pipe and is coupled to the at least one mountain portion, and the heat exchange pipe is disposed around the supply pipe, the return pipe, and the reverse pipe to enclose the supply pipe, the return pipe, and the reverse pipe, a plurality of heat exchange pipe is disposed along an axial direction of the supply pipe; and the first heat medium which flows into the supply pipe through the first transfer line simultaneously passes through the supply pipe and the heat exchange pipe to undergo heat exchange and then flows into the reverse pipe and the first heat medium flowing into the reverse pipe may flow out to the first transfer line through the return pipe.

The interval maintaining member may maintain a predetermined interval between mountain portions.

The interval maintaining member may be formed to have a rod shape and attached on an inner circumferential surface or an outer circumferential surface of the heat exchange pipe along the length direction of the heat exchange pipe.

The interval maintaining member may include a concave and convex portion formed to have a shape corresponding to at least one mountain portion to be coupled to the at least one mountain portion.

The underground heat exchange device includes: a transfer module which supplies the first heat medium having undergone heat exchange in the plurality of heat pump units to an underground direction and returns the first heat medium having undergone heat exchange in the underground to the first transfer line; a heat exchange module which performs heat exchange of the first heat medium supplied from the transfer module and then transmits the first heat medium having undergone heat exchange to the transfer module; and at least one return module which changes the flow of the first heat medium having undergone heat exchange while passing through the heat exchange module and transmits the first heat medium to the heat exchange module, and the plurality of modules which is sequentially disposed along one direction is connected to each other through at least one of a flange and a socket.

The plurality of cooling and heating units is formed by at least one of a cooling and heating pipe and a fan coil unit connected to the second transfer line.

The first transfer line includes: a supply pipe which is connected to the underground heat exchange device to transmit the first heat medium having undergone heat exchange in the underground heat exchange device at one side and return the first heat medium having undergone heat exchange in the plurality of heat pump units at the other side; and a manifold which is respectively branched from one side and the other side of the supply pipe to transmit the first heat medium having undergone heat exchange in the underground heat exchange device to the plurality of heat pump units and transmit the first heat medium having undergone heat exchange in the plurality of heat pump units to the supply pipe, and the first heat medium which is transmitted to the supply pipe through the manifold is mixed in the supply pipe to be stirred to return to the underground heat exchange device.

An underground heat exchange type cooling and heating system according to another embodiment of the present invention includes an underground heat exchange device which is buried under the ground to allow heat to be exchanged between a first heat medium flowing therein and a geothermal heat; a plurality of cooling and heating units which cools or heats an indoor space by means of a second heat medium flowing therein; a plurality of heat pump units which allows heat to be exchanged between the first heat medium and the second heat medium to change the second heat medium to have a setting temperature for cooling or heating and individually performs a cooling or heating operation; a plurality of heat storage tanks which stores the second heat medium having undergone heat exchange in the plurality of heat pump units and the second heat medium discharged from the plurality of cooling and heating units; a first transfer line which transmits the first heat medium having undergone heat exchange in the underground heat exchange device to the plurality of heat pump units and transmits the first heat medium having undergone heat exchange in the plurality of heat pump units to the underground heat exchange device; a second transfer line which transmits the second heat medium having undergone heat exchange in the plurality of heat pump units to the plurality of heat storage tanks and transmits the second heat medium stored in the plurality of heat storage tanks to the plurality of heat pump units; and a third transfer line which transmits the second heat medium stored in the plurality of heat storage tanks to the plurality of cooling and heating units and transmits the second heat medium discharged from the plurality of cooling and heating units to the plurality of heat storage tanks.

An underground heat exchange type cooling and heating system according to still another embodiment of the present invention includes an underground heat exchange device which is buried under the ground to allow heat to be exchanged between a first heat medium flowing therein and a geothermal heat; a plurality of cooling and heating units which cools or heats an indoor space by means of a second heat medium flowing therein; a plurality of heat pump units which allows heat to be exchanged between the first heat medium and the second heat medium to change the second heat medium to have a setting temperature for cooling or heating and individually performs a cooling or heating operation; a heat storage tank in which the first heat medium having undergone heat exchange in the underground heat exchange device flows in an upper side to be stored and the first heat medium having undergone heat exchange in the plurality of heat pump units flows in a lower side to be stored; a first transfer line which transmits the first heat medium having undergone heat exchange in the underground heat exchange device to the upper side of the heat storage tank and transmits the first heat medium which flows in the lower side of the heat storage tank to be stored, to the underground heat exchange device; a second transfer line which transmits the first heat medium flowing into the upper side of the heat storage tank to be stored, to the plurality of heat pump units, and transmits the first heat medium having undergone heat exchange in the plurality of heat pump units to the lower side of the heat storage tank; and a third transfer line which transmits the second heat medium having undergone heat exchange in the plurality of heat pump units to the plurality of cooling and heating units and transmits the second heat medium discharged from the plurality of cooling and heating units to the plurality of heat pump units.

An underground heat exchange type cooling and heating system according to still another embodiment of the present invention includes an underground heat exchange device which is buried under the ground to exchange heat of a first heat medium flowing therein with geothermal heat; a plurality of cooling and heating units which cools or heats an indoor space by means of a second heat medium flowing therein; a plurality of heat pump units which allows heat to be exchanged between the first heat medium and the second heat medium to change the second heat medium to have a setting temperature for cooling or heating and individually performs a cooling or heating operation; a first heat storage tank in which the first heat medium having undergone heat exchange in the underground heat exchange device flows in an upper side to be stored and the first heat medium having undergone heat exchange in the plurality of heat pump units flows in a lower side to be stored; a plurality of second heat storage tanks which stores the second heat medium having undergone heat exchange in the plurality of heat pump units and the second heat medium discharged from the plurality of cooling and heating units; a first transfer line which transmits the first heat medium having undergone heat exchange in the underground heat exchange device to the upper side of the first heat storage tank and transmits the first heat medium which flows in the lower side of the first heat storage tank to be stored, to the underground heat exchange device; a second transfer line which transmits the first heat medium flowing into the upper side of the first heat storage tank to be stored, to the plurality of heat pump units, and transmits the first heat medium having undergone heat exchange in the plurality of heat pump units to the lower side of the first heat storage tank; a third transfer line which transmits the second heat medium having undergone heat exchange in the plurality of heat pump units to the plurality of second heat storage tanks and transmits the second heat medium stored in the plurality of second heat storage tanks to the plurality of heat pump units; and a fourth transfer line which transmits the second heat medium stored in the plurality of second heat storage tanks to the plurality of cooling and heating units and transmits the second heat medium discharged from the plurality of cooling and heating units to the plurality of second heat storage tanks.

Advantageous Effects

According to the embodiment of the present invention, the second heat medium which is supplied to the plurality of cooling and heating units is changed to a setting temperature using the first heat medium which exchanges heat by the underground heat exchange device and is individually supplied to the plurality of cooling and heating units to cool or heat an indoor space, thereby easily changing cooling and heating and significantly improving an energy efficiency as compared with the existing cooling and heating device using fossil fuel or the cooling heating device using electricity. Therefore, the cooling and heating costs may be saved.

Further, the heat of the first heat medium is exchanged by means of the underground heat exchange device including a supply pipe, a return pipe, a reverse pipe, and a spiral heat exchange pipe to improve the heat exchange efficiency by increasing a heat exchange area of the first heat medium.

Further, the underground heat exchange device is configured as a module so that the convenience for carrying and installing the device may be improved and the device may be partially replaced to allow easy maintenance and further, allow cost saving.

Further, the underground heat exchange device is formed as a module to be selectively extended or reduced in accordance with the environment of the buried area and the capacity of the cooling and heating system, to increase applicability and usability.

Furthermore, the interval maintaining member is coupled to the heat exchange pipe to space apart the mountain portions of the heat exchange pipe which is configured to have a spiral shape or a coil shape with a predetermined interval therebetween so that the mechanical stability of the heat exchange pipe is improved. Therefore, even though the underground heat exchange device is buried under the ground, the deformation or the damage of the heat exchange pipe due to the surrounding underground environment may be prevented and further, the degradation of the heat exchange efficiency may be prevented.

MODES OF THE INVENTION

Figure 1:
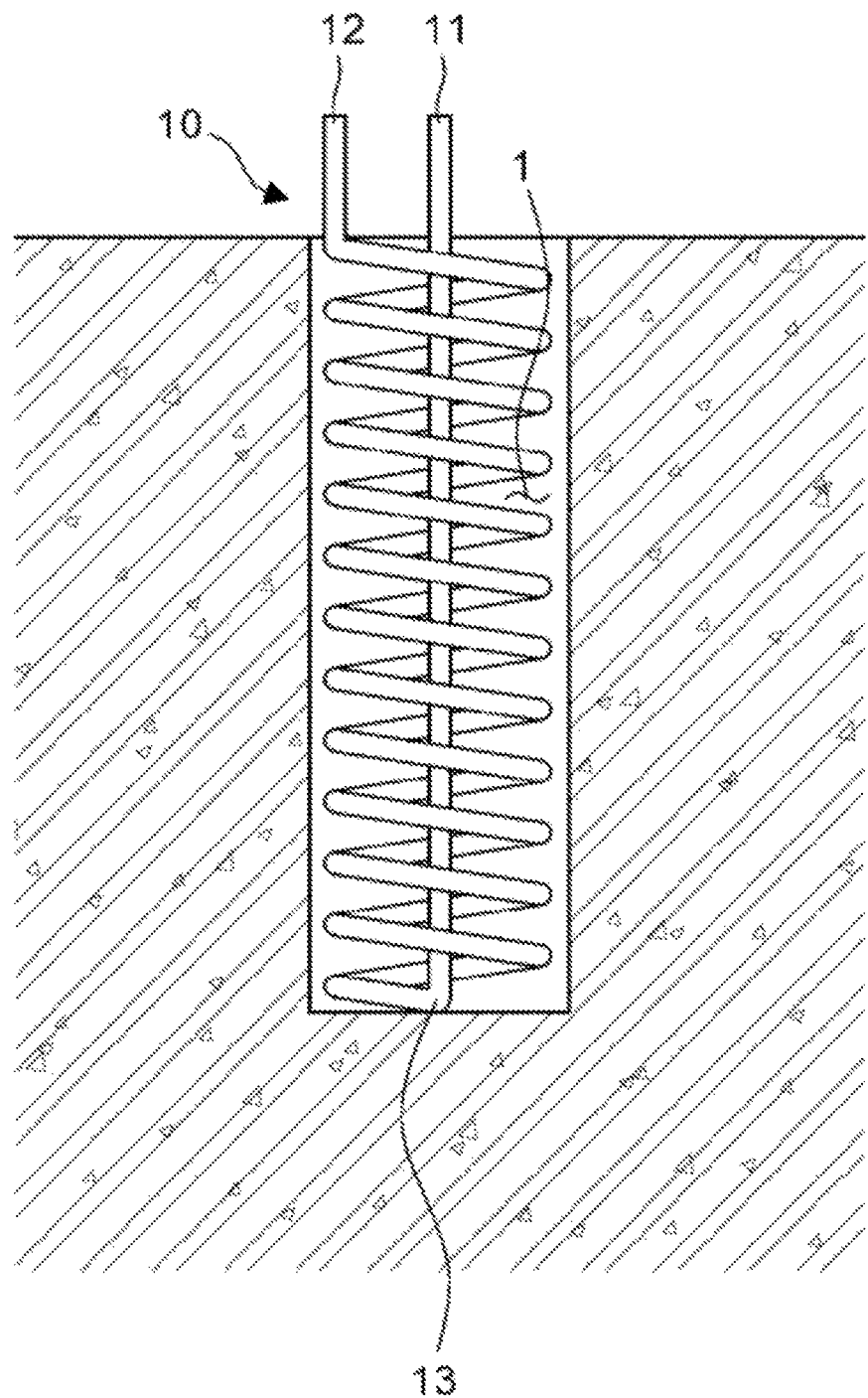
FIG. 1 is a view schematically illustrating an underground heat exchange device of the related art.

Hereinafter, various embodiments will be described in more detail with reference to accompanying drawings. The embodiment disclosed in the present specification may be modified in various forms. A specific embodiment is illustrated in the drawings and is described in detail in the detailed description. However, the specific embodiment disclosed in the accompanying drawing is merely provided for easy understanding of various embodiments. Accordingly, it should be understood that the technical spirit is not limited by the specific embodiment disclosed in the accompanying drawing, but includes all equivalents or alternatives included in the spirit of and the technical scope of the present invention.

Terms including an ordinary number, such as first and second, are used for describing various constituent elements, but the constituent elements are not limited by the terms. The above terms are used only to discriminate one component from the other component.

In the present specification, it should be understood that terminology "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance. It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

In the meantime, the term "module" or" "unit" for components used in the present specification performs at least one function or operation. Further, "module" or "unit" may perform a function or an operation by hardware and software or a combination of hardware and software. Further, a plurality of "modules" or a plurality of "units" excluding "module" or "unit" which has to be executed in a specific hardware or is executed in at least one processor may be integrated as at least one module. A singular form may include a plural form if there is no clearly opposite meaning in the context.

In addition, in the description of the present disclosure, a detailed description of known configurations or functions incorporated herein will be contracted or omitted when it is determined that the detailed description may make the subject matter of the present disclosure unclear.

Figure 2:
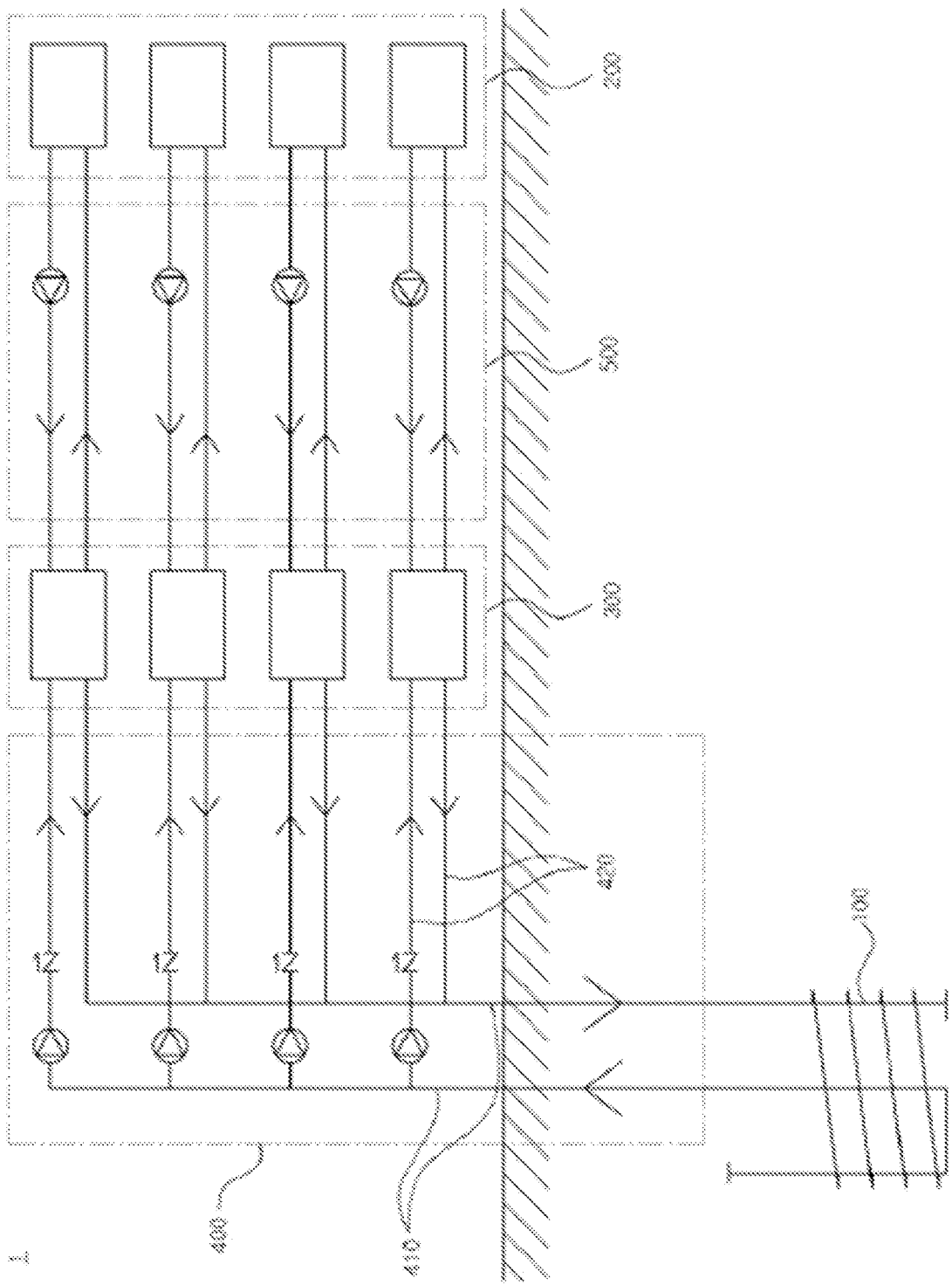
FIG. 2 is a conceptual view schematically illustrating an underground heat exchange type cooling and heating system according to an embodiment of the present invention.

FIG. 2 is a conceptual view schematically illustrating an underground heat exchange type cooling and heating system 1 according to an embodiment of the present invention.

Referring to FIG. 2, an underground heat exchange type cooling and heating system 1 according to an embodiment of the present invention (hereinafter, referred to as "an underground heat exchange type cooling and heating system 1") includes an underground heat exchange device 100.

The underground heat exchange device 100 is buried under the ground to allow heat to be exchanged between a first heat medium flowing therein and the geothermal heat by a reverse return method. The underground heat exchange device 100 is formed as a module to be selectively extended or reduced according to the environment of the buried area or a capacity of the cooling and heating system.

The underground heat exchange device 100 will be described in more detail with reference to FIGS. 3 to 19.

Figure 3:
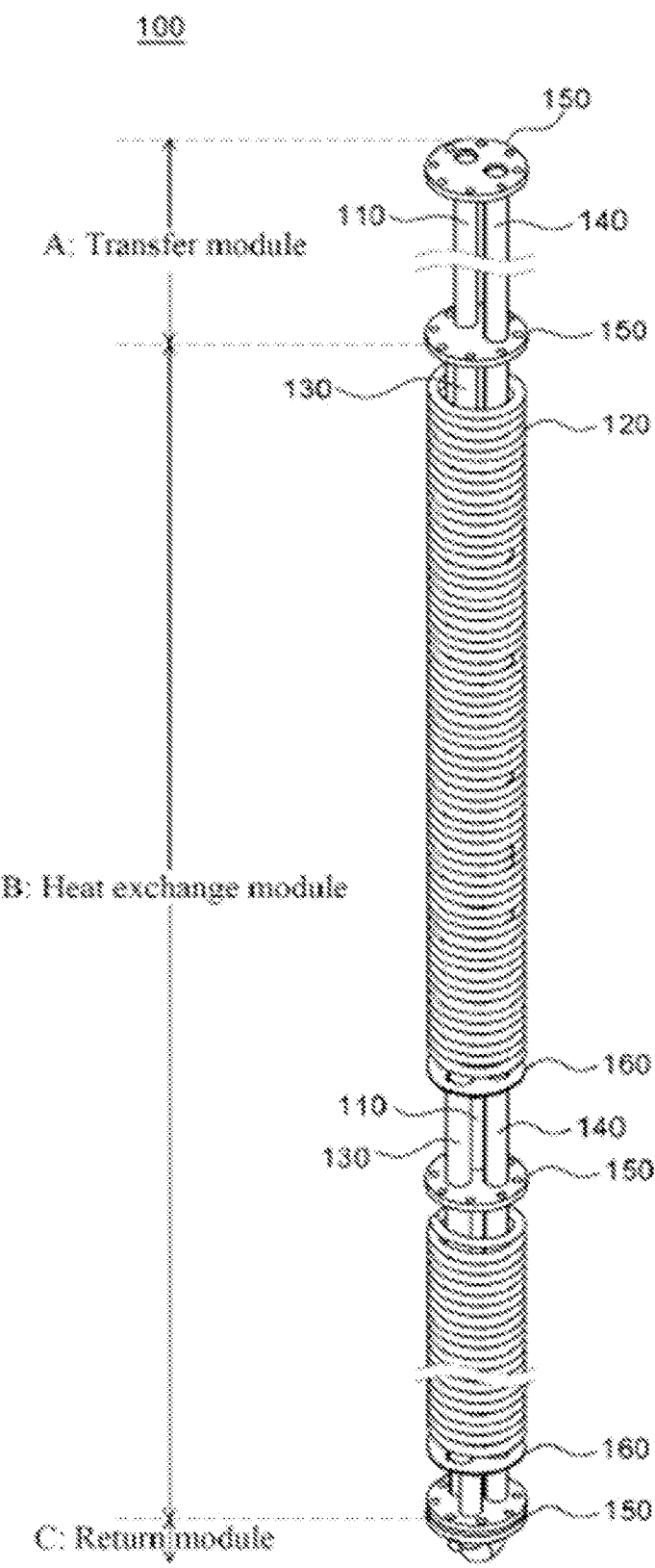
FIG. 3 is a perspective view illustrating an underground heat exchange device of an underground heat exchange type cooling and heating system according to an embodiment of the present invention.
Figure 4:
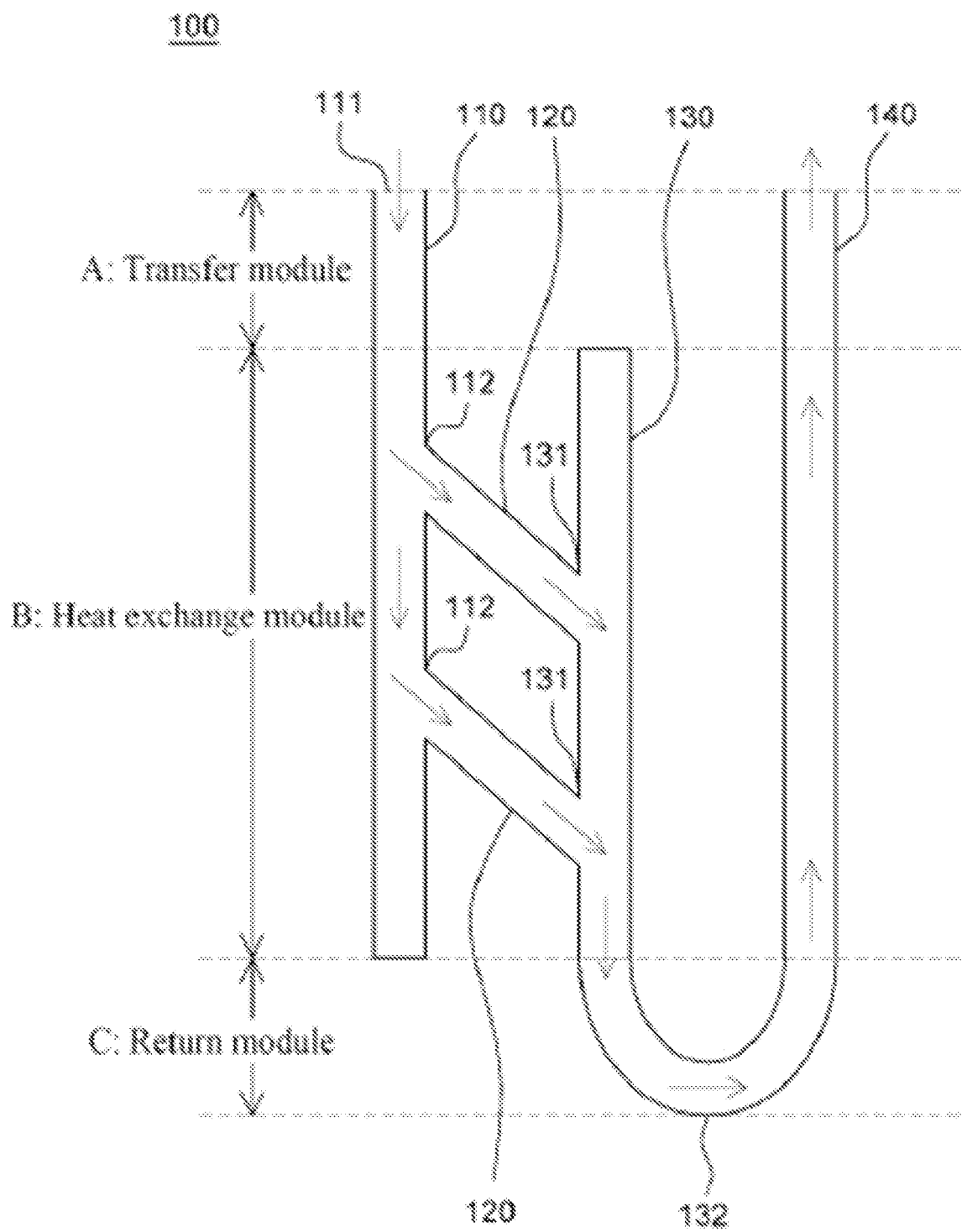
FIG. 4 is a view schematically illustrating a process of circulating a heat medium in an underground heat exchange device of an underground heat exchange type cooling and heating system according to an embodiment of the present invention.
Figure 5:
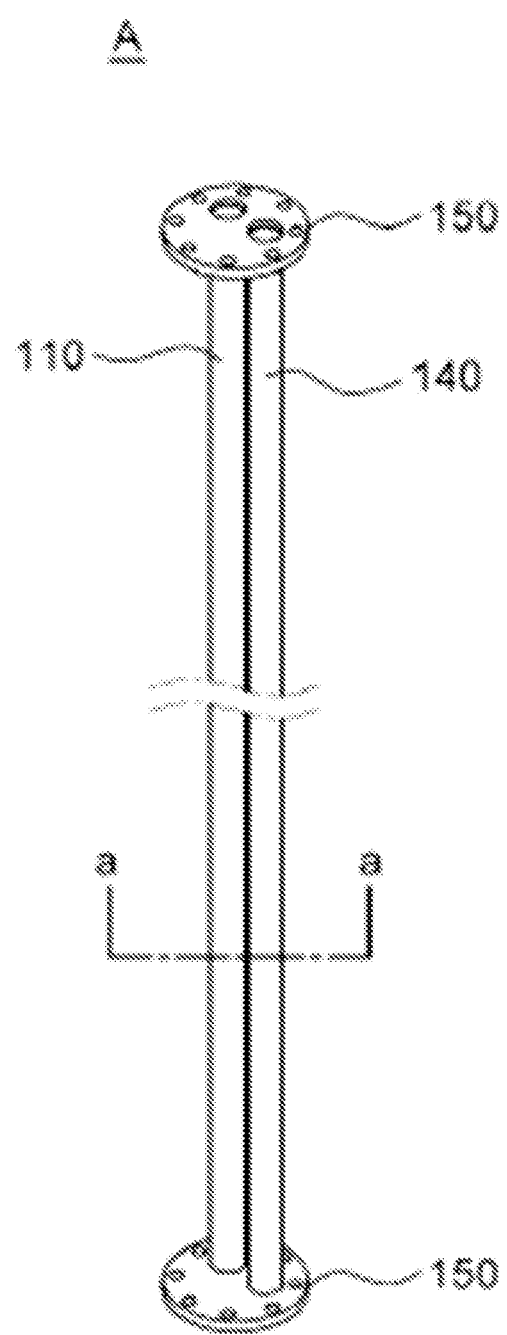
FIG. 5 is a perspective view illustrating a transfer module of an underground heat exchange device of an underground heat exchange type cooling and heating system according to an embodiment of the present invention.

FIG. 3 is a perspective view illustrating an underground heat exchange device 100 of the underground heat exchange type cooling and heating system 1, FIG. 4 is a view schematically illustrating a process of circulating a heat medium in an underground heat exchange device 100 of the underground heat exchange type cooling and heating system 1, and FIG. 5 is a perspective view illustrating a transfer module A of an underground heat exchange device 100 of the underground heat exchange type cooling and heating system 1.

Referring to FIGS. 3 and 4, the underground heat exchange device 100 may include a supply pipe 110 which is connected to a first transfer line 400 to be described below to supply a first heat medium (not illustrated) into the ground from the outside, a heat exchange pipe 120 which is connected to the supply pipe 110 to exchange heat of the first heat medium, a reverse pipe 130 which is connected to the heat exchange pipe 120 and collects the first heat medium having undergone heat exchange, and a return pipe 140 which is connected to the reverse pipe 130 and the first transfer line 400 and discharges the first heat medium from the underground to the outside. Accordingly, the first heat medium flowing in the supply pipe 110 through the first transfer line 400 simultaneously passes through the supply pipe 110 and the heat exchange pipe 120 to allow the heat to be exchanged and then flows to the reverse pipe 130 and the first heat medium flowing to the reverse pipe 130 may be discharged to the first transfer line 400 through the return pipe 140.

Referring to FIGS. 3 to 5, the supply pipe 110 supplies the first heat medium which is supplied from the outside through the first transfer line 400 to the underground and the return pipe 140 may return the first heat medium having undergone heat exchange in the underground heat exchange device 100 to the outside (the first transfer line 400), again. Here, the supply pipe 110 and the return pipe 140 are open to a ground surface and as illustrated in FIG. 1, may be connected to a plurality of heat pump units 300 to be described below through the first transfer line 400. For example, lengths and diameters of the supply pipe 110 and the return pipe 140 may be determined depending on a depth of the buried area or a capacity of the cooling and heating system. Each of the supply pipe 110 and the return pipe 140 may be formed by one pipe or a set of a plurality of pipes. The supply pipe 110 may be formed such that an opening 111 in which a first heat medium flows from the outside and an opening 112 connected to the heat exchange pipe 120 are open and the remaining area is sealed. Therefore, the first heat medium flowing in the supply pipe 110 may entirely flow to the heat exchange pipe 120.

The heat exchange pipe 120 is connected to the supply pipe 110 to receive the first heat medium from the supply pipe 110 and guide the first heat medium in one direction to allow the heat of the first heat medium to be exchanged in the underground. For example, the heat exchange pipe 120 may be desirably formed to be in contact with soil or groundwater in the underground with a large surface area as much as possible.

Referring to FIGS. 3 and 4, the heat exchange pipe 120 is disposed on circumferences of the supply pipe 110, the reverse pipe 130, and the return pipe 140 to enclose the supply pipe 110, the reverse pipe 130, and the return pipe 140. To be more specific, the heat exchange pipe 120 is formed to have a spiral shape or a coil shape with at least one mountain portion formed along the length direction of the supply pipe 110 to connect the supply pipe 110 and the reverse pipe 130 to each other. Further, the heat exchange pipe 120 guides the movement of the first heat medium supplied through the supply pipe 110 to flow the first heat medium into the reverse pipe 130 to allow the heat of the first heat medium to be exchanged. Accordingly, the first heat medium flowing through the spiral heat exchange pipe 120 is subjected to the heat exchange for a relatively longer time than that of a linear type pipe with the same length.

Further, a plurality of heat exchange pipes 120 may be disposed along an axial direction of the supply pipe 110. By doing this, in the underground heat exchange device 100, the heat exchange may be performed in a plurality of positions.

However, the heat exchange pipe 120 is not necessarily limited to this shape and may be modified in various structures and shapes so as to be sufficiently in contact with a heat medium material in the underground such as soil or groundwater. For example, the heat exchange pipe 120 may be changed to various structures with an increased surface area and an increased flow path, such as a structure which is separated into a plurality of minute pipes from the supply pipe 110 and then combined again to be connected to the reverse pipe 130.

The reverse pipe 130 is inserted into the ground to be perpendicular to the ground surface together with the supply pipe 110 and the return pipe 140 so that one side may be connected to the return pipe 140 and the other side may be connected to the heat exchange pipe 120. Accordingly, the first heat medium which moves to the heat exchange pipe 120 to allow the heat to be exchanged flows into the reverse pipe 130 through the other side of the reverse pipe 130 to be collected. For example, only an end portion 131 of the reverse pipe 130 in which the first heat medium flows from the heat exchange pipe 120 and a part 132 connected to the return pipe 140 are open and the other areas are sealed. Therefore, the overall first heat medium having undergone heat exchange which is collected in the reverse pipe 130 may flow to the return pipe 140.

As described above, the heat exchange pipe 120 and the reverse pipe 130 may significantly increase a heat exchange area of the first heat medium in a buried space of the underground heat exchange device 100. In other words, the heat exchange pipe 120 and the reverse pipe 130 may serve to ensure a flowing path of the first heat medium to allow the first heat medium which flows into the underground through the supply pipe 110 to exchange heat while sufficiently remaining in a space in the underground. Therefore, the underground heat exchange device 100 may significantly improve a heat exchange efficiency in the underground through the heat exchange pipe 120 and the reverse pipe 130.

Further, the underground heat exchange device 100 may be formed of any one of a stainless-steel material, a SUS material, and a polyethylene (PE) material or a combination thereof. That is, the underground heat exchange device 100 may be formed of any one of a stainless steel material, a SUS material, and a polyethylene (PE) material or the supply pipe 110, the reverse pipe 130, and the return pipe 140 and the heat exchange pipe 120 which includes relatively a large number of curved structures to increase the surface area may be formed with different materials. However, the underground heat exchange device 100 is not necessarily limited thereto and may be manufactured with various materials in a condition which can perform the same function.

In the meantime, the underground heat exchange device 100 may be divided into a transfer module A, a heat exchange module B, and a return module C depending on the functions and each module may be formed to be detachable from each other.

Referring to FIG. 3, the underground heat exchange device 100 may include the transfer module A which supplies a first heat medium having undergone heat exchange in a plurality of heat pump units 300 to be described below to the underground direction and returns the first heat medium having undergone heat exchange in the underground to the first transfer line 400, the heat exchange module B which performs the heat exchange of the first heat medium supplied from the transfer module A and then transmits the first heat medium having undergone heat exchange to the transfer module A, and at least one return module C which changes the flow of the first heat medium having undergone heat exchange while passing through the heat exchange module B and transmits the first heat medium to the heat exchange module B.

Here, the plurality of modules which is disposed sequentially along one direction may be connected to each other by means of a connection unit.

Figure 17:
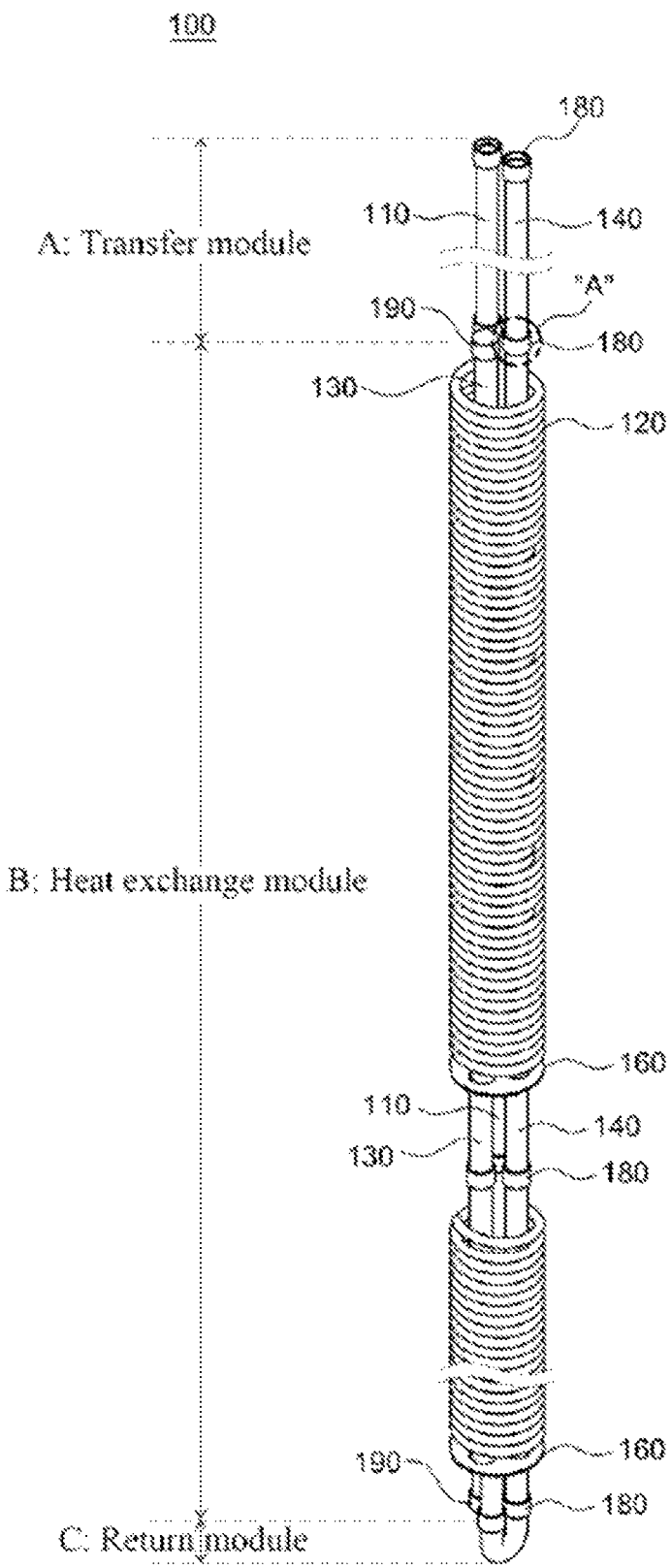
FIG. 17 is a perspective view illustrating a state in which modules of an underground heat exchange device are connected to each other by means of a socket in an underground heat exchange type cooling and heating system according to an embodiment of the present invention.
Figure 18:
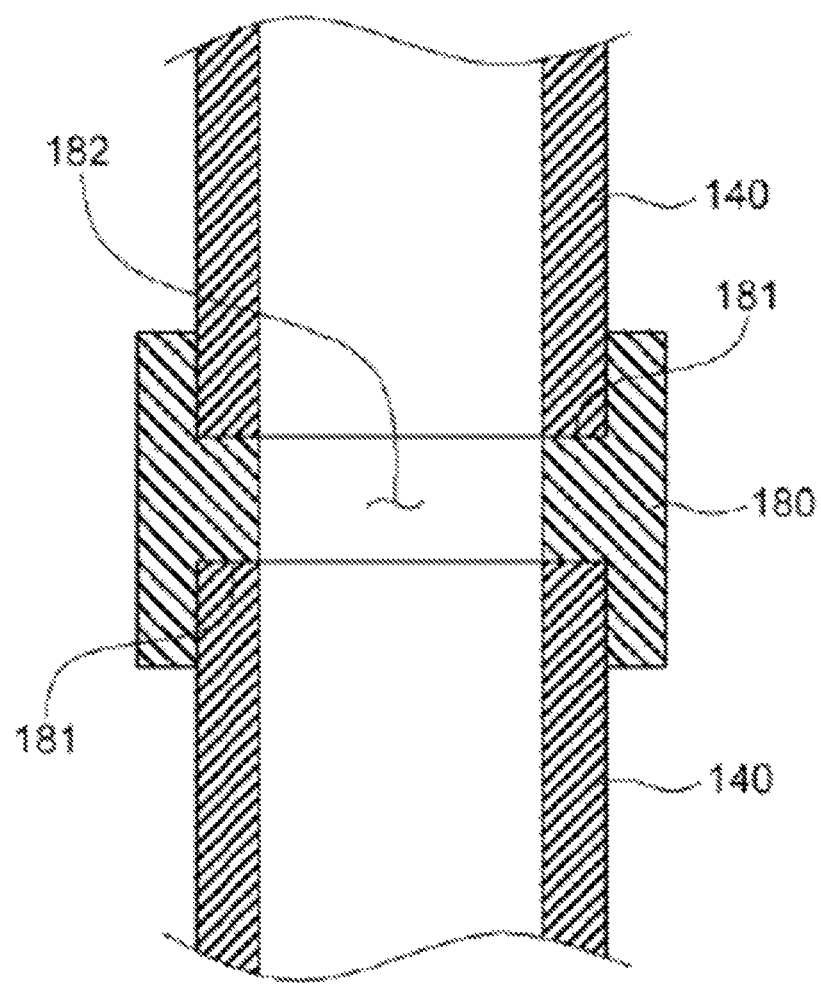
FIG. 18 is a cross-sectional view schematically illustrating a cross-section of a part "A" of FIG. 17.
Figure 19:
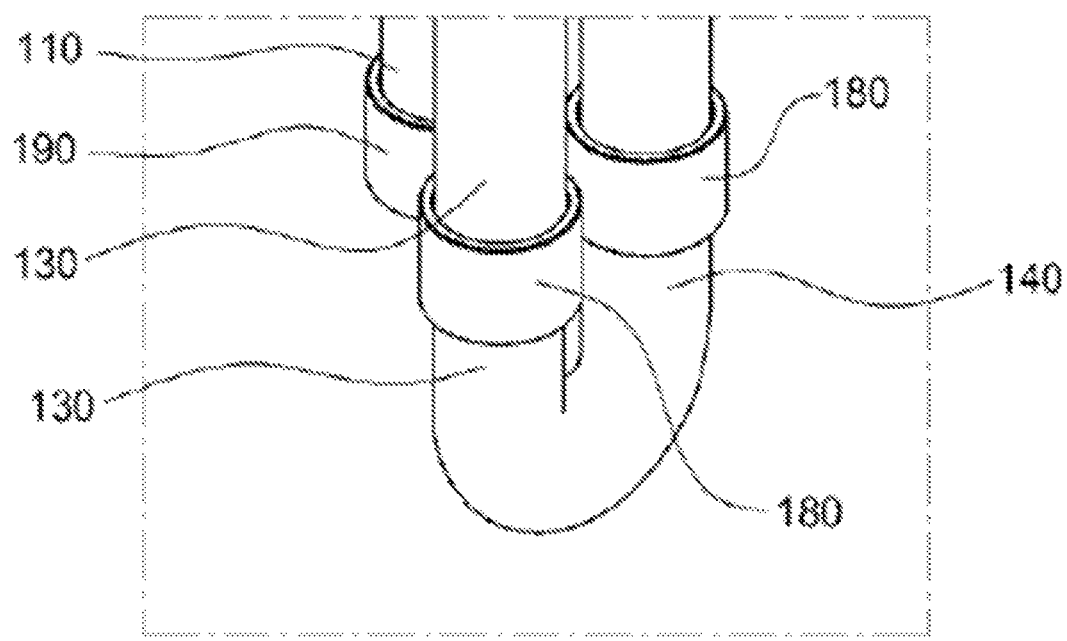
FIG. 19 is a perspective view schematically illustrating a state in which a cap unit is installed in a supply pipe of a return module of an underground heat exchange device of an underground heat exchange type cooling and heating system according to an embodiment of the present invention.

FIG. 17 is a perspective view illustrating a state in which modules of an underground heat exchange device 100 are connected to each other by means of a socket 180 in the underground heat exchange type cooling and heating system 1. FIG. 18 is a cross-sectional view schematically illustrating a cross-section of a part "A" of FIG. 17. FIG. 19 is a perspective view schematically illustrating a state in which a cap unit 190 is installed in a supply pipe 110 of a return module C of an underground heat exchange device 100 of the underground heat exchange type cooling and heating system 1.

Referring to FIGS. 3 and 17, a connection unit may include at least one of a flange 150 and a socket 180. Accordingly, the plurality of modules which is sequentially disposed along one direction may be connected to each other or separated from each other by means of at least one of the flange 150 and the socket 180.

Each module of the underground heat exchange device 100 will be described in more detail with reference to FIGS. 5 to 13. For the convenience of description, FIGS. 3 and 4 may also be referred to.

Figure 6:
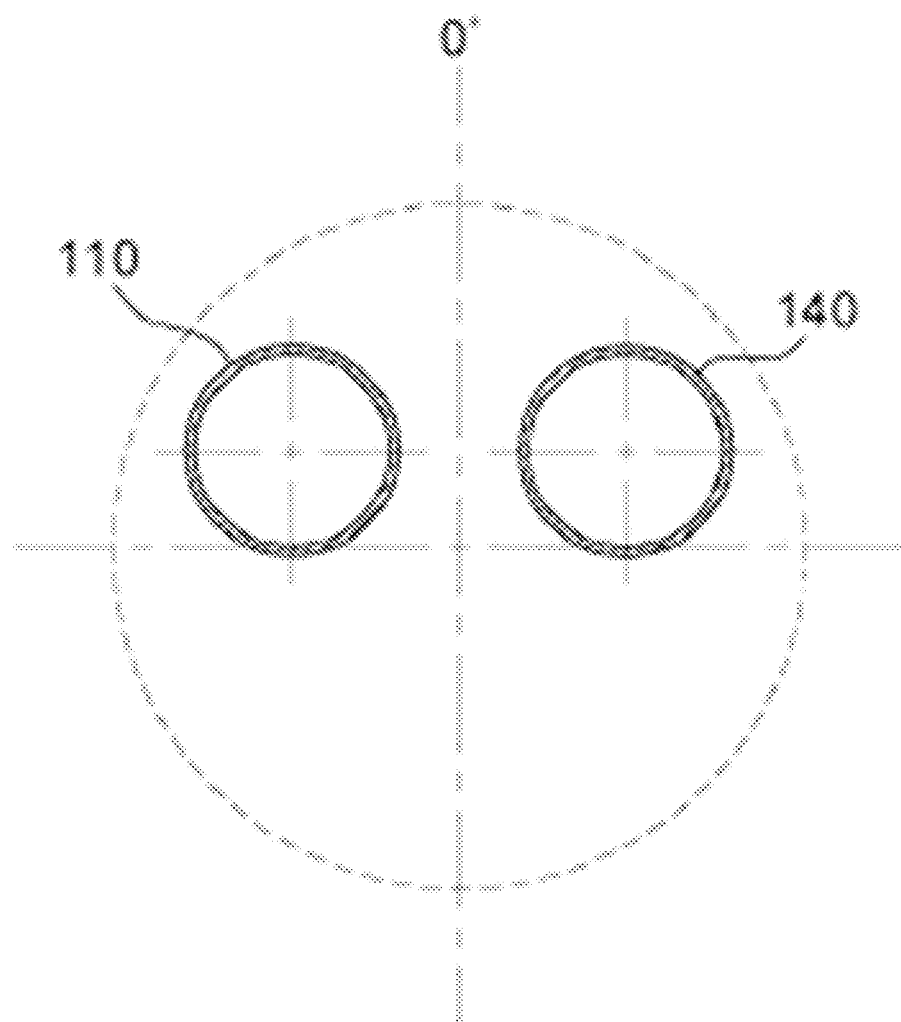
FIG. 6 is a cross-sectional view taken along the line a-a of FIG. 5.
Figure 7:
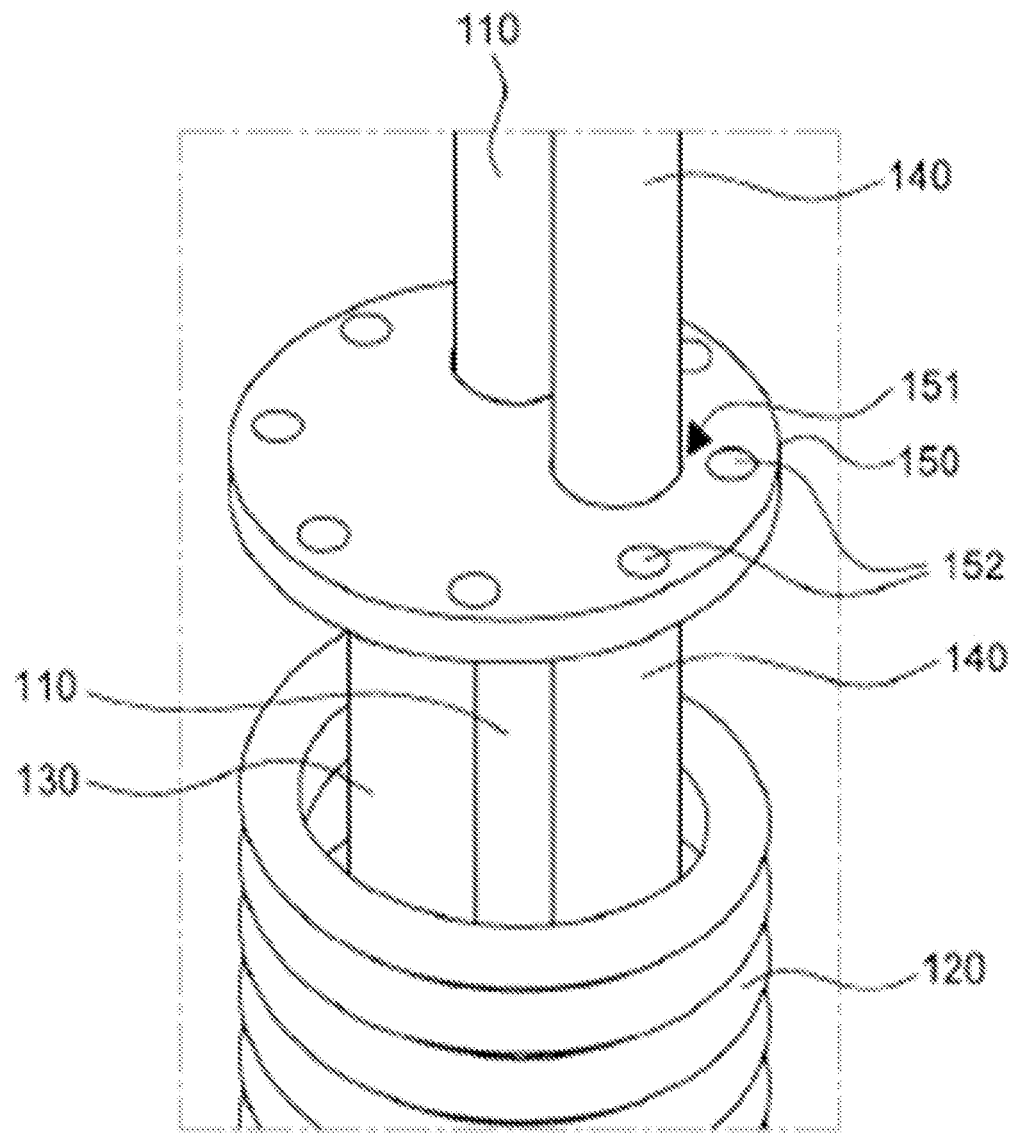
FIG. 7 is a perspective view illustrating a part that a transfer module and a heat exchange module of an underground heat exchange device are connected in an underground heat exchange type cooling and heating system according to an embodiment of the present invention.
Figure 8:
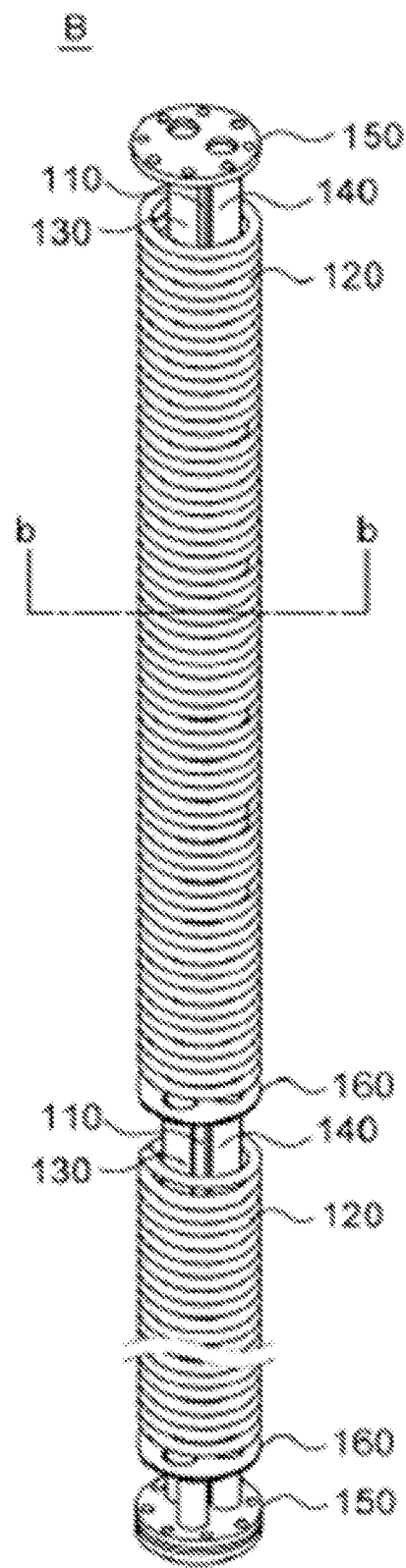
FIG. 8 is a perspective view illustrating a heat exchange module of an underground heat exchange device of an underground heat exchange type cooling and heating system according to an embodiment of the present invention.
Figure 9:
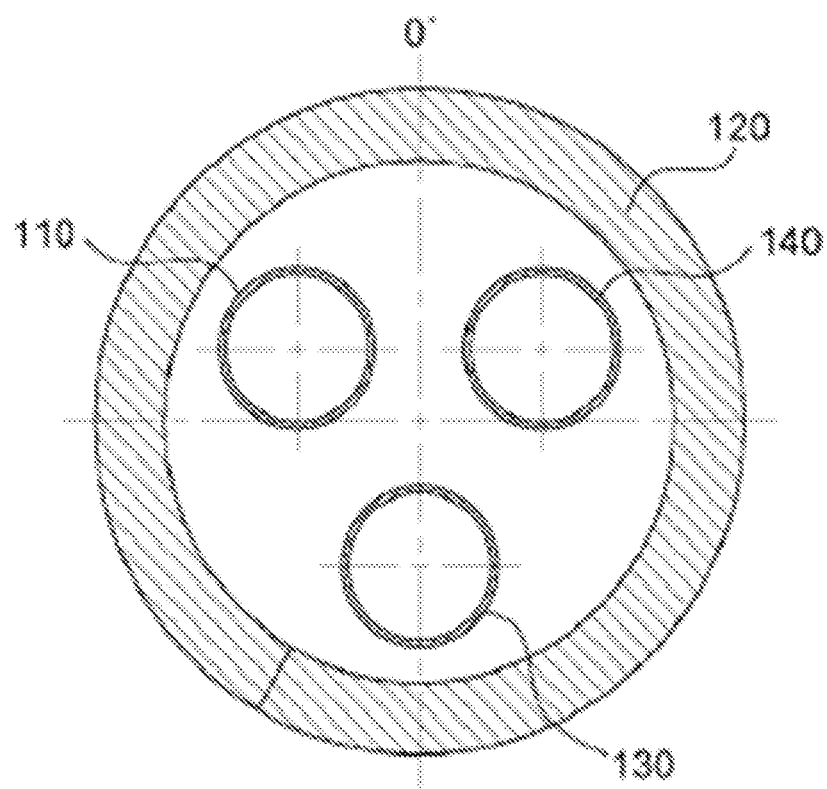
FIG. 9 is a cross-sectional view taken along the line b-b of FIG. 8.
Figure 10A:
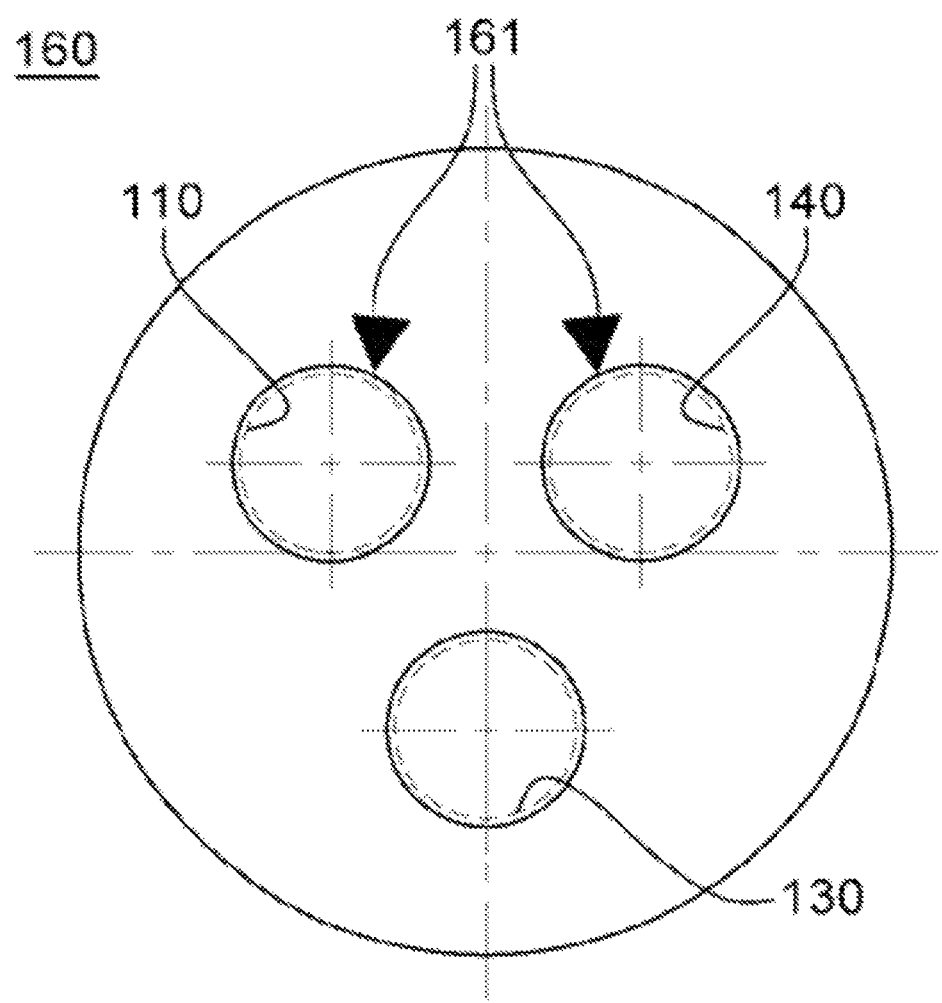
FIGS. 10A to 10C are front views illustrating a pipe spacing member of an underground heat exchange device of an underground heat exchange type cooling and heating system according to an embodiment of the present invention.
Figure 10B:
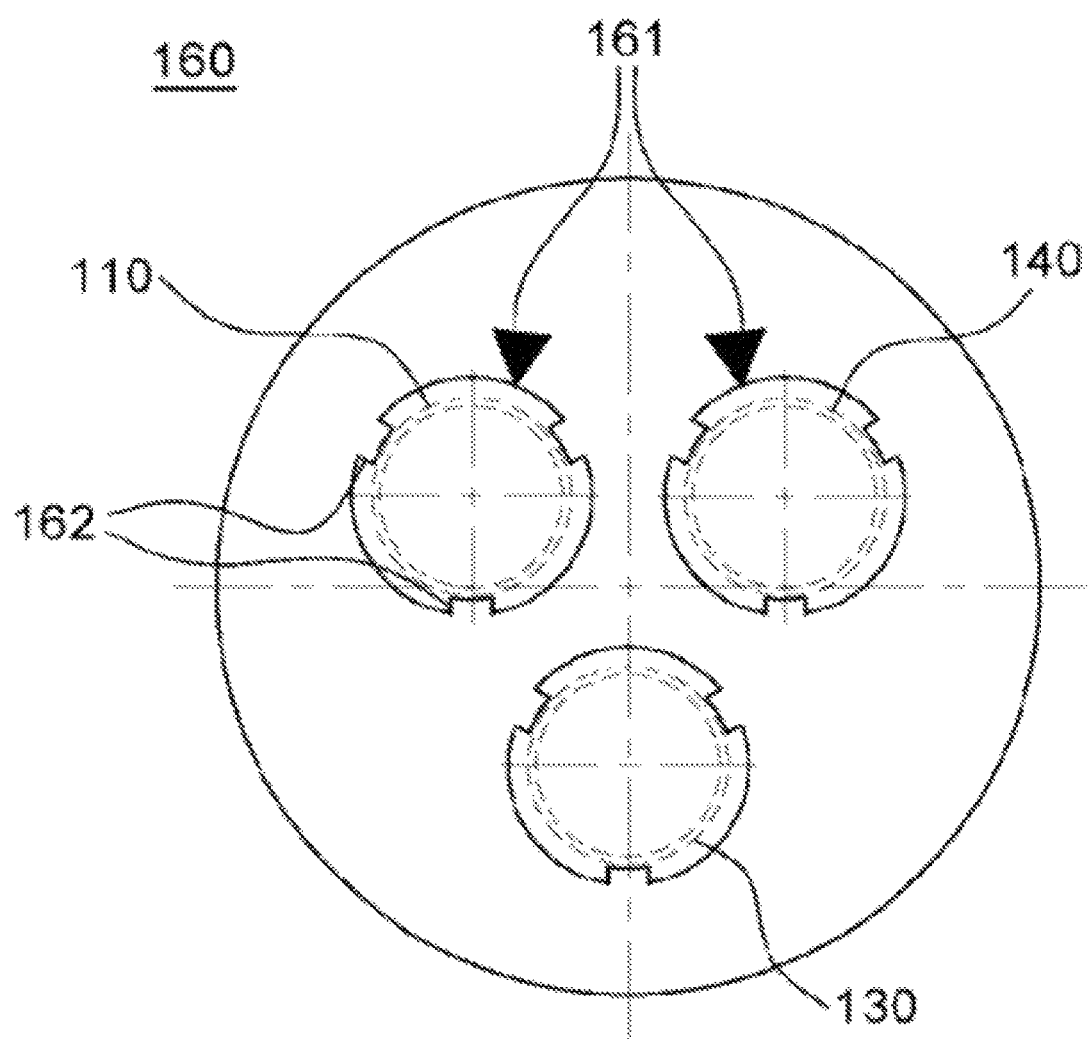
Figure 10C:
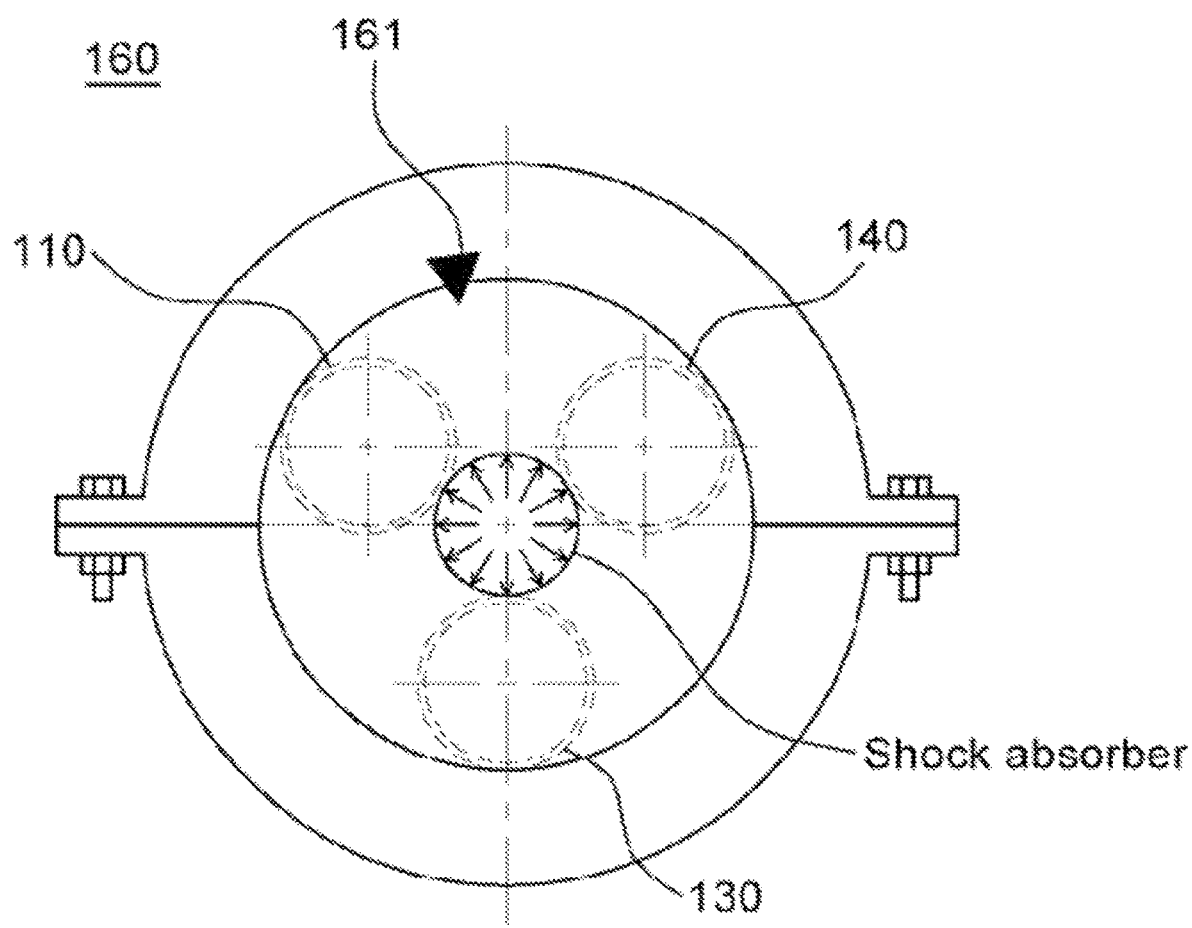
Figure 11:
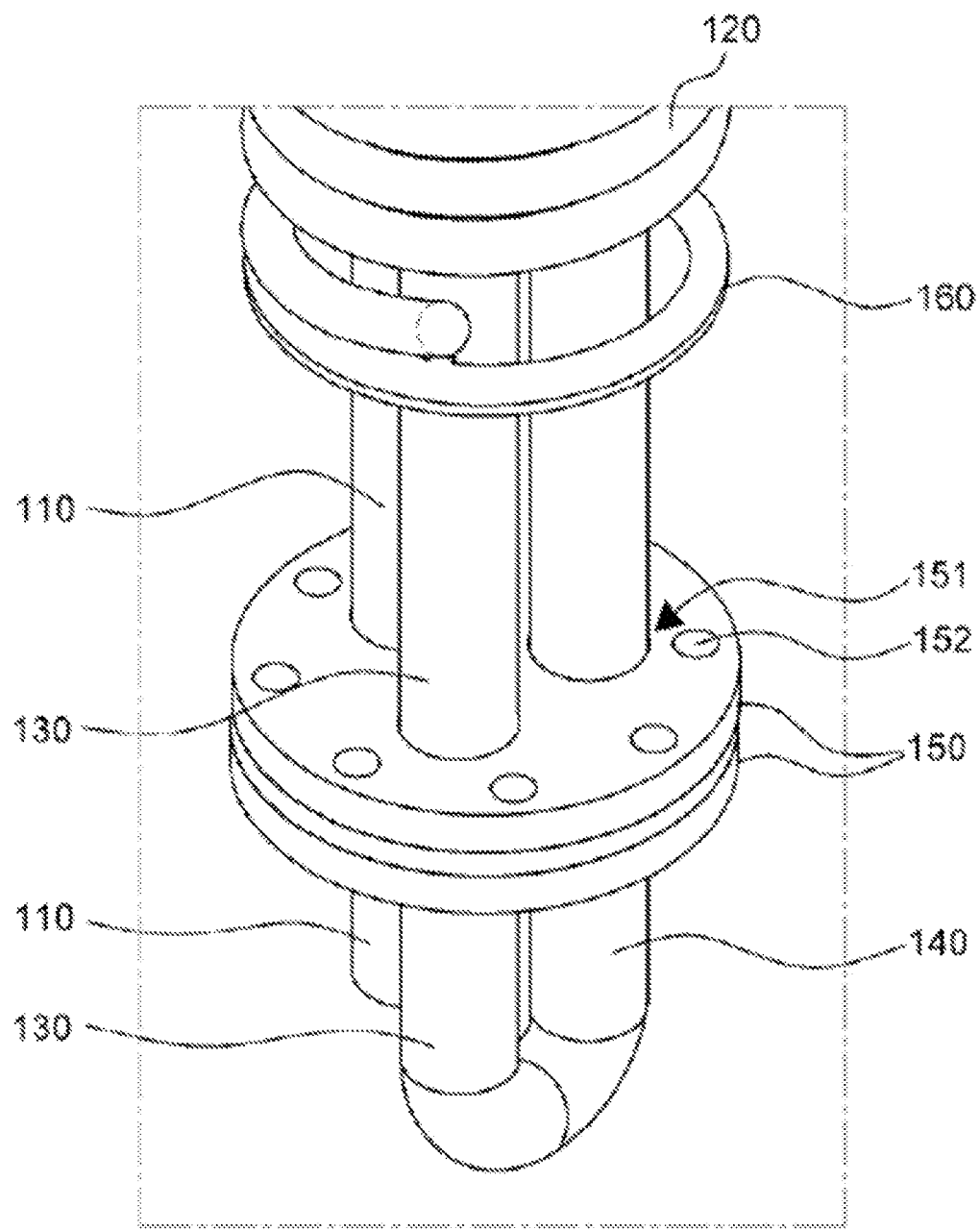
FIG. 11 is a perspective view illustrating a part that a heat exchange module and a return module of an underground heat exchange device are connected in an underground heat exchange type cooling and heating system according to an embodiment of the present invention.
Figure 12A:
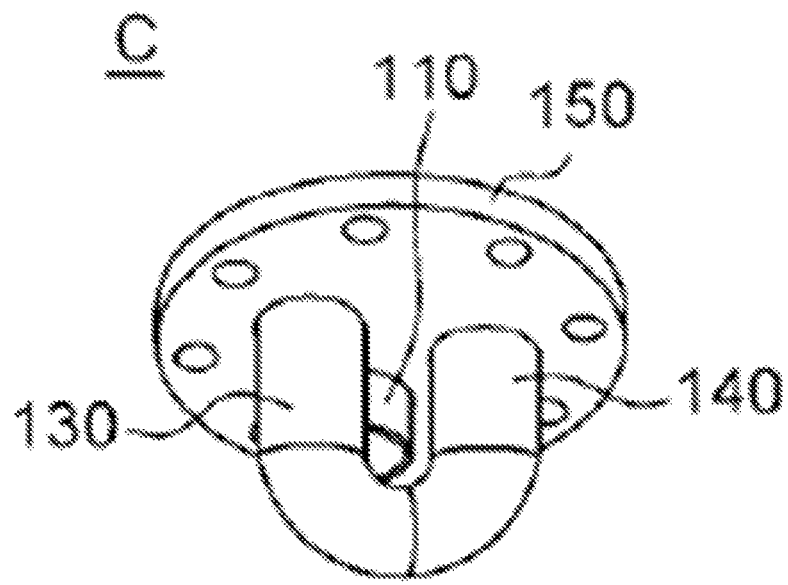
FIGS. 12A and 12B are perspective views illustrating a return module of an underground heat exchange device of an underground heat exchange type cooling and heating system according to an embodiment of the present invention.
Figure 12B:
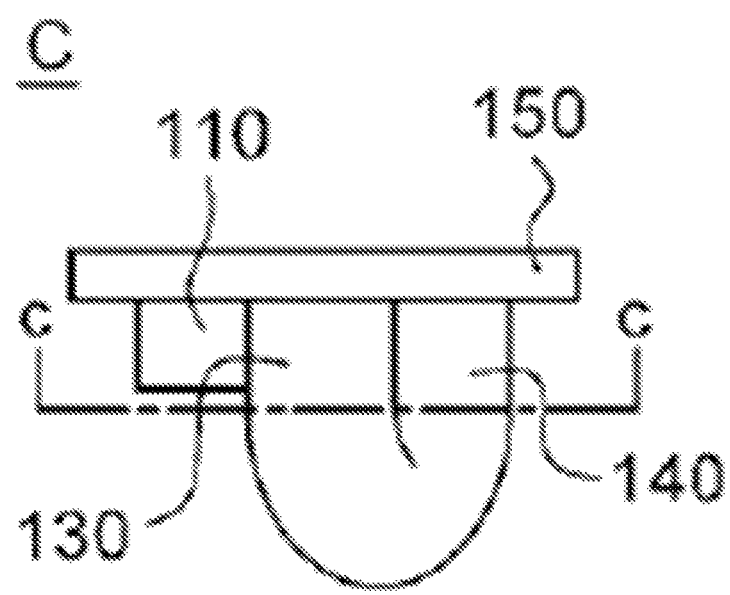
Figure 13:
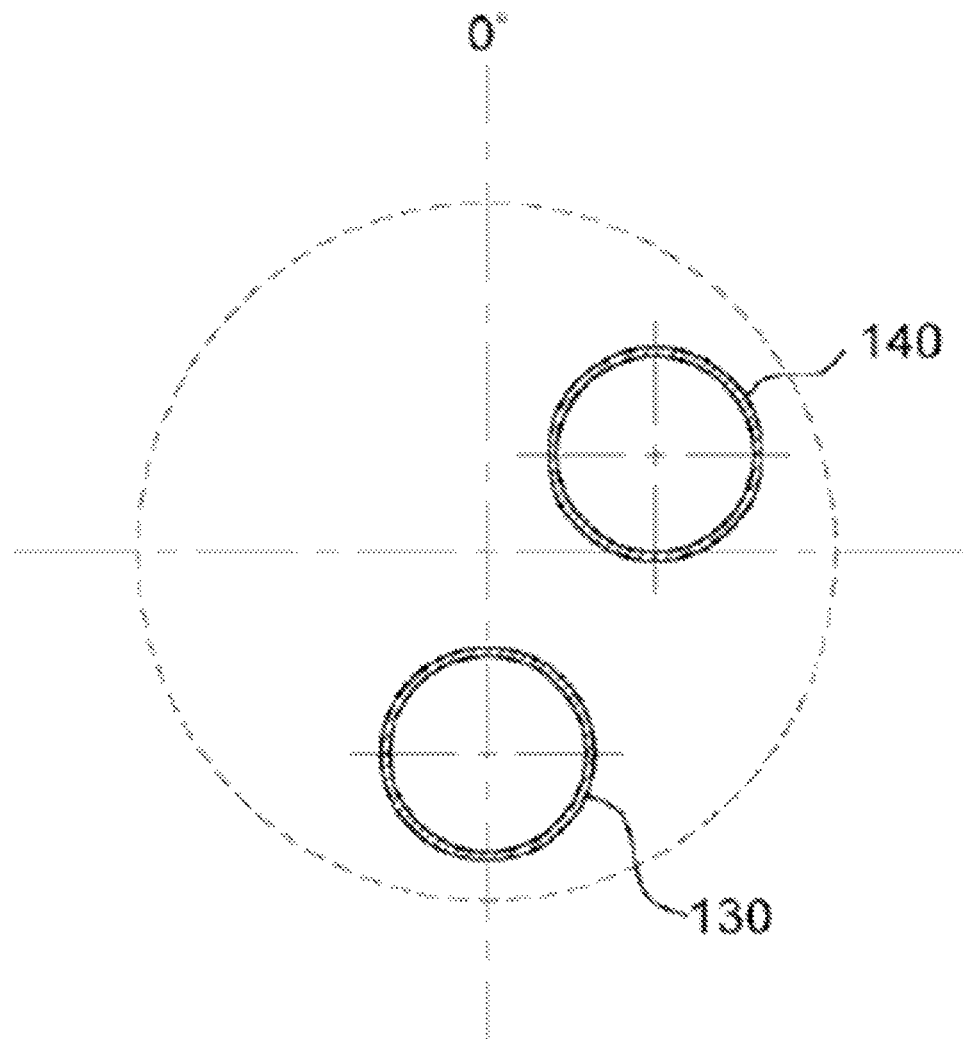
FIG. 13 is a cross-sectional view taken along the line c-c of FIG. 12B.

FIG. 6 is a cross-sectional view taken along the line a-a of FIG. 5. FIG. 7 is a perspective view illustrating a part that a transfer module A and a heat exchange module B of an underground heat exchange device 100 are connected in the underground heat exchange type cooling and heating system 1. FIG. 8 is a perspective view illustrating a heat exchange module B of an underground heat exchange device 100 of the underground heat exchange type cooling and heating system 1. FIG. 9 is a cross-sectional view taken along the line b-b of FIG. 8. FIGS. 10A to 10C are front views illustrating a pipe spacing member 160 of an underground heat exchange device 100 of the underground heat exchange type cooling and heating system 1. FIG. 11 is a perspective view illustrating a part that a heat exchange module B and a return module C of an underground heat exchange device 100 are connected in the underground heat exchange type cooling and heating system 1. Further, FIGS. 12A and 12B are perspective views illustrating a return module C of an underground heat exchange device 100 of the underground heat exchange type cooling and heating system 1. FIG. 13 is a cross-sectional view taken along the line c-c of FIG. 12B.

Referring to FIGS. 3, 5 to 7, and 17, the transfer module A includes the supply pipe 110 and the return pipe 140 to supply the first heat medium to the underground heat exchange device 100 and return the first heat medium having undergone heat exchange in the underground heat exchange device 100 to the outside, again.

The transfer module A includes the supply pipe 110 and the return pipe 140 and at least one of the flange 150 and the socket 180 may be installed at both ends formed by the supply pipe 110 and the return pipe 140 for connection with the heat exchange module B.

Referring to FIG. 7, the flange 150 may include a plurality of holes 150 which connects the transfer module A and the heat exchange module B to allow the supply pipe 110 and the return pipe 140 to pass therethrough to communicate with each other. The flange 150 is formed to have a disc shape and a plurality of bolt fastening units 152 may be formed therein along a circumferential direction.

Referring to FIGS. 17 and 18, the socket 180 may be formed with a tube shape which is stepped inside along the axial direction. To be more specific, the socket 180 may include a plurality of coupling grooves 181 through which the supply pipe 110 and the return pipe 140 are inserted to be seated and a communication holes 182 by which the supply pipe 110 inserted into the plurality of coupling grooves 181 and the return pipe 140 communicate with each other so that the supply pipe 110 and the return pipe 140 equipped in the transfer module A and the heat exchange module B are coupled in a set position. For example, the socket 180 and a connection part of each pipe which is connected to the socket 180 may be integrally connected by welding, heat fusion, ultrasonic fusion, etc. Further, threads may be further formed on an inner circumferential surface of the socket 180 and an outer circumferential surface of each pipe which is in contact with the inner circumferential surface of the socket 180 to be engaged with each other.

Further, one side of the transfer module A is disposed to be directed to the ground surface and may be formed to allow the supply pipe 110 and the return pipe 140 to be outwardly open so that the heat medium may flow. Further, the other side is disposed to be in contact with the heat exchange module B and may be open to be connected to the supply pipe 110 and the return pipe 140 of the heat exchange module B.

In the meantime, in the transfer module A, the supply pipe 110 and the return pipe 140 are desirably disposed to be parallel to each other and in consideration of the arrangement type with the reverse pipe 130 to be described below, as illustrated in FIG. 6, may be desirably disposed to form a relative position of +60 degrees and −60 degrees with respect to a reference point 0 degree.

Referring to FIGS. 7 to 11, the heat transfer module B may include a supply pipe 110, a reverse pipe 130, and a return pipe 140 and guide the first heat medium in one direction so that the first heat medium supplied from the transfer module A allows the heat to be exchanged in the underground.

The heat exchange module B may be configured such that the heat exchange pipe 120 is spirally enclosed on the supply pipe 110, the reverse pipe 130, and the return pipe 140. The supply pipe 110 and the return pipe 140 of the heat exchange module B may communicate with the supply pipe 110 and the return pipe 140 of the transfer module A. Accordingly, the heat transfer module B exchanges the heat of the first heat medium transmitted from the supply pipe 110 of the transfer module B and then transmits the heat medium having undergone heat exchange to the return pipe 140 of the transfer module A again.

Further, the heat exchange pipe 120 of the heat exchange module B may include an end portion 121 (hereinafter, referred to as a first end portion) connected to the supply pipe 110 and an end portion 122 (hereinafter, referred to as a second end portion) connected to the reverse pipe 130 and may be spirally formed between the first end portion 121 and the second end portion 122. For example, the first end portion 121 is an end portion at which the first heat medium flows from the supply pipe 110 to the heat exchange pipe 120, and the second end portion 122 is an end portion at which the first heat medium having undergone heat exchange flows to the reverse pipe 130. Therefore, in consideration of the flow of the first heat medium, the first end portion 121 may be desirably disposed to be adjacent to the transfer module A and the second end portion 122 may be desirably disposed to be adjacent to the return module C to be described below. Further, a plurality of heat exchange pipes 120 may be disposed along a length direction of the heat exchange module B.

Further, the heat exchange module B may include a pipe spacing member 160 which disposes the supply pipe 110, the reverse pipe 130, and the return pipe 140 to space apart from each other with a predetermined interval therebetween.

Referring to FIG. 10A, the pipe spacing member 160 is formed to have a disk shape and may include a plurality of holes 161 through which the supply pipe 110, the reverse pipe 130, and the return pipe 140 pass. For example, the plurality of holes 161 may be formed to have a size corresponding to an outer diameter of each pipe. Accordingly, the supply pipe 110, the reverse pipe 130, and the return pipe 140 which pass through the plurality of holes 161 are supported on an inner surface of the pipe spacing member 160 to stably maintain a vertical state without causing deviation of a central axis.

In the meantime, referring to FIG. 10B, in the pipe spacing member 160, a support structure which supports the supply pipe 110, the reverse pipe 130, and the return pipe 140 may be further formed.

To be more specific, the plurality of holes 161 equipped in the pipe spacing member 160 is formed to be larger than a diameter of the corresponding pipe and at least one protrusion 162 which protrudes to a center direction of the hole 161 may be formed on an inner circumferential surface of the pipe spacing member 160 with holes 161 so that the supply pipe 110, the reverse pipe 130, and the return pipe 140 do not flow in the hole 161.

Here, an end of the protrusion 162 which supports the outer surface of each pipe may be formed to have a shape corresponding to an outer surface of the pipe and a buffer material formed of an elastic material which is in contact with the outer surface of each pipe to absorb or distribute vibration or shocks transmitted from the pipe may be equipped at the end of the protrusion 162. Further, the protrusion 162 may be integrally formed with the pipe spacing member 160 or separately manufactured from the pipe spacing member 160 to be installed in the hole 161. Further, the protrusion may be integrally provided with the pipe spacing member 160 by heterogeneous injection but may be applied with the above-described elastic material.

Accordingly, the protrusion 162 supports the supply pipe 110, the reverse pipe 130, and the return pipe 140 which pass through the hole 161 so that the pipes are spaced apart from each other with a predetermined interval and may be firmly fixed so as not to be deviated from its position when the pipes are inserted into the underground.

Further, the pipe spacing member 160 may be disposed to be close to the first end portion 121 at which the heat exchange pipe 120 is connected to the supply pipe 110 and close to the second end portion 122 at which the heat exchange pipe 120 is connected to the reverse pipe 130. The pipe spacing member 160 disposed in this position may serve to support the heat exchange pipe 120 so as not to flow in the length direction of the heat exchange module B. By doing this, the pipe spacing member 160 may allow the supply pipe 110, the reverse pipe 130, and the return pipe 140 to be spaced apart from each other with a predetermined interval and support the heat exchange pipe 120, simultaneously, to improve the durability of the underground heat exchange device 100.

However, a shape of the pipe spacing member 160 is not limited to the shape illustrated in the drawing but may be modified in various shapes to maintain the interval from the pipes.

For example, referring to FIG. 10C, the pipe spacing member 160 is divided into a plurality of components and may be assembled with a ring shaped assembly structure to support the outer circumferential surfaces of the supply pipe 110, the reverse pipe 130, and the return pipe 140 by the inner circumferential surface. In this case, a buffer material formed of an elastic material which supports the pipes from the inside to the outside may be provided between the supply pipe 110, the reverse pipe 130, and the return pipe 140.

Referring to FIGS. 3, 4, 8, and 17, the heat exchange module B may be detachably connected to the return module C through at least one of the flange 150 and the socket 180. In this case, the supply pipe 110 of the heat exchange module B may communicate with the supply module 110 of the transfer module A and the remaining part excluding a part connected to the heat exchange pipe 120 may be sealed. For example, at an end portion of the supply pipe 110 of the heat exchange module B, as illustrated in FIGS. 17 and 18, a cap unit 190 which closes one opening of the supply pipe 110 may be installed. Therefore, the supply pipe 110 of the heat exchange module B is formed to be sealed at the side of the return module C and only the reverse pipe 130 and the return pipe 140 of the heat exchange module B may be formed to communicate to the return module C by at least one of the flange 150 and the socket 180.

In the meantime, referring to FIG. 9, in the heat exchange module B, the supply pipe 110, the reverse pipe 130, and the return pipe 140 are desirably disposed to be parallel to each other. The supply pipe 110 and the return pipe 140 form a relative position of +60 degrees and −60 degrees with respect to a reference point 0 degree, similarly to the supply pipe 110 and the return pipe 140 of the transfer module A. Further, the reverse pipe 130 is desirably disposed to form an angle of 120 degrees with the supply pipe 110 and the return pipe 140, respectively.

Referring to FIGS. 11 to 13, the return module C may serve to transmit the first heat medium which has undergone heat exchange and then is collected in the reverse pipe 130 to the return pipe 140 and change the flow of the first heat medium which moves from the ground surface to the underground direction to the reverse pipe 130. That is, the first heat medium which flows in from the outside moves to the underground direction via the supply pipe 110, the heat exchange pipe 120, and the reverse pipe 130. In this case, the return module C may serve to change the direction of the first heat medium to guide the first heat medium to flow to the ground surface by the return pipe 140.

In the return module C, the reverse pipe 130 and the return pipe 140 are connected to each other and a connection part of the reverse pipe 130 and the return pipe 140 may be formed to have a U shape to change the flow of the first heat medium.

Further, in the return module C, one sides of the reverse pipe 130 and the return pipe 140 are disposed to be parallel to each other like a "U"-shape and the other sides are connected to each other. Here, the reverse pipe 130 and the return pipe 140 which are disposed to be parallel may be disposed to form a relative position of +60 degrees and +180 degrees with respect to the reference point 0 degree, as illustrated in FIG. 13.

In the meantime, referring to FIGS. 12A and 12B, even though it is illustrated that an end portion of the supply pipe 110 extends to the return module C to protrude, unlike illustrated in the drawing, the end portion of the supply pipe 110 is formed only to a boundary between the heat exchange module B and the return module C but does not protrude toward the return module C. However, the end portion of the supply pipe 110 may maintain a sealed state in any case.

Further, a plurality of transfer modules A and heat exchange modules B of the underground heat exchange device 100 are provided in consideration of an installation environment to extend to be coupled.

For example, in order to allow the heat to be exchanged in the groundwater band located at a predetermined depth of the underground, the underground heat exchange device 100 may be configured such that a plurality of transfer modules A extends to be fastened from the ground surface to the groundwater band and a plurality of heat exchange modules B extends to be fastened as deep as the depth of the groundwater band and then finally the return module C is fastened. Furthermore, when there is a plurality of groundwater bands at different depths, the underground heat exchange device 100 may be configured such that the transfer module A extends to an upper groundwater band to be fastened, the heat exchange module B extends to a depth of the upper groundwater band to be fastened and then the transfer module A extends to a lower groundwater band to be fastened, and the heat exchange module B extends to the depth of the lower groundwater band to be fastened, and finally, the return module C is fastened.

Further, the underground heat exchange device 100 may include interval maintaining members 170 and 170'.

Figure 14:
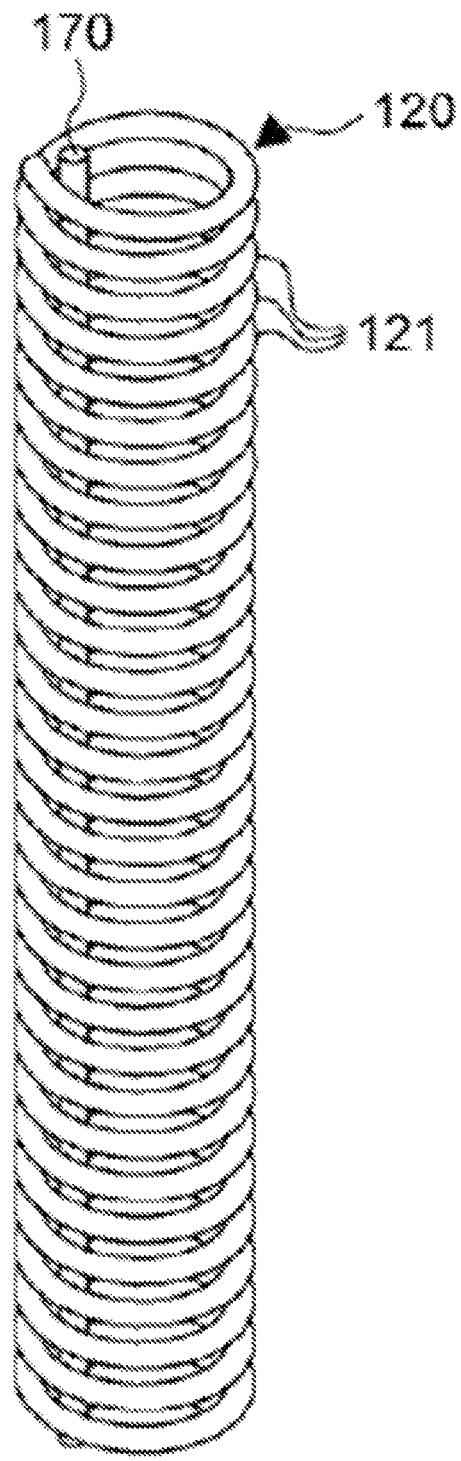
FIG. 14 is a perspective view illustrating a heat exchange pipe and an interval maintaining member coupled to the heat exchange pipe of an underground heat exchange device of an underground heat exchange type cooling and heating system according to an embodiment of the present invention.

FIG. 14 is a perspective view illustrating a heat exchange pipe 120 and an interval maintaining member 170 coupled to the heat exchange pipe 120 of an underground heat exchange device 100 of the underground heat exchange type cooling and heating system 1. FIG. 15 is a cross-sectional view schematically illustrating a state in which an interval maintaining member 170 is installed in an underground heat exchange device 100 of an underground heat exchange type cooling and heating system 1. FIG. 16 is a front view illustrating another embodiment of an interval maintaining member 170' of an underground heat exchange device 100 of the underground heat exchange type cooling and heating system 1.

Figure 15A:
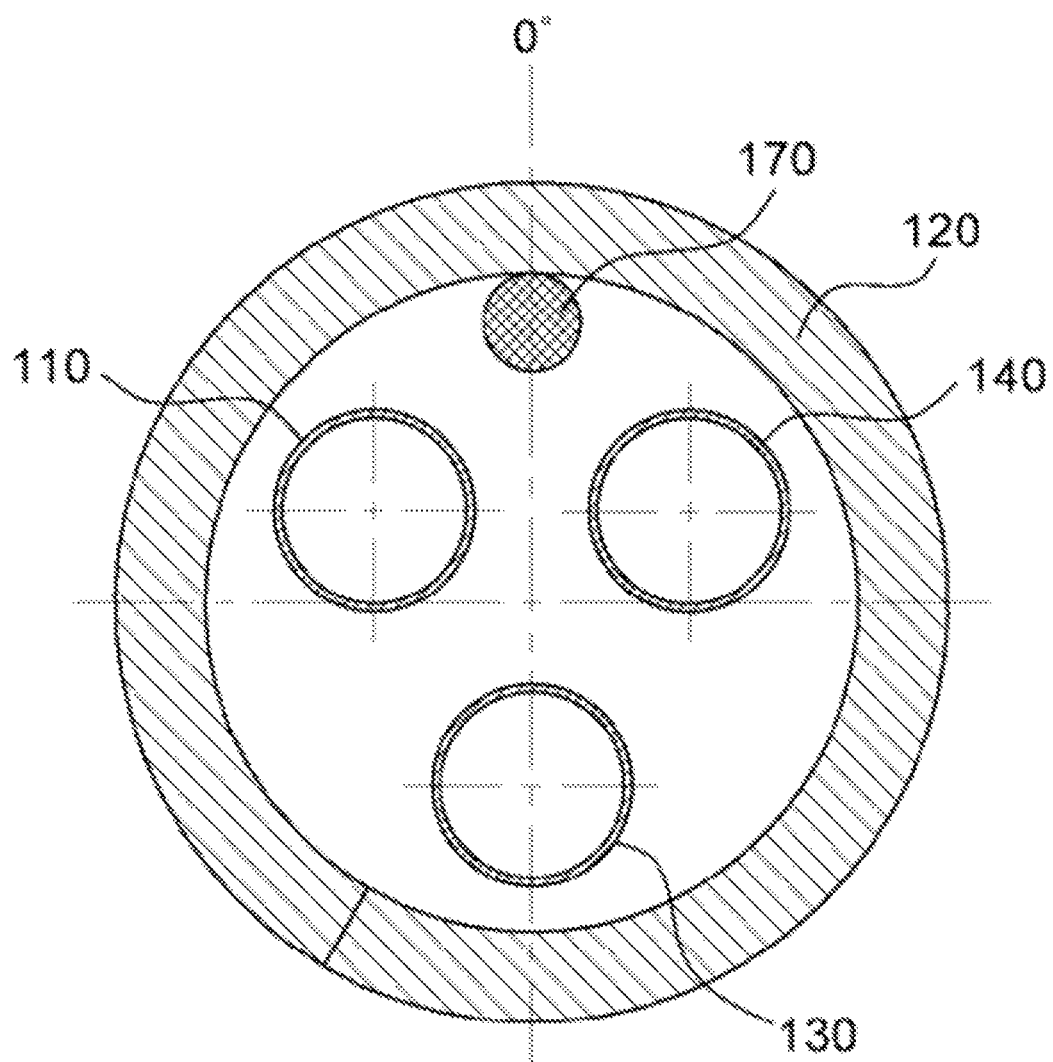
FIGS. 15A and 15B are cross-sectional views schematically illustrating a state in which an interval maintaining member is installed in an underground heat exchange device of an underground heat exchange type cooling and heating system according to an embodiment of the present invention.
Figure 15B:
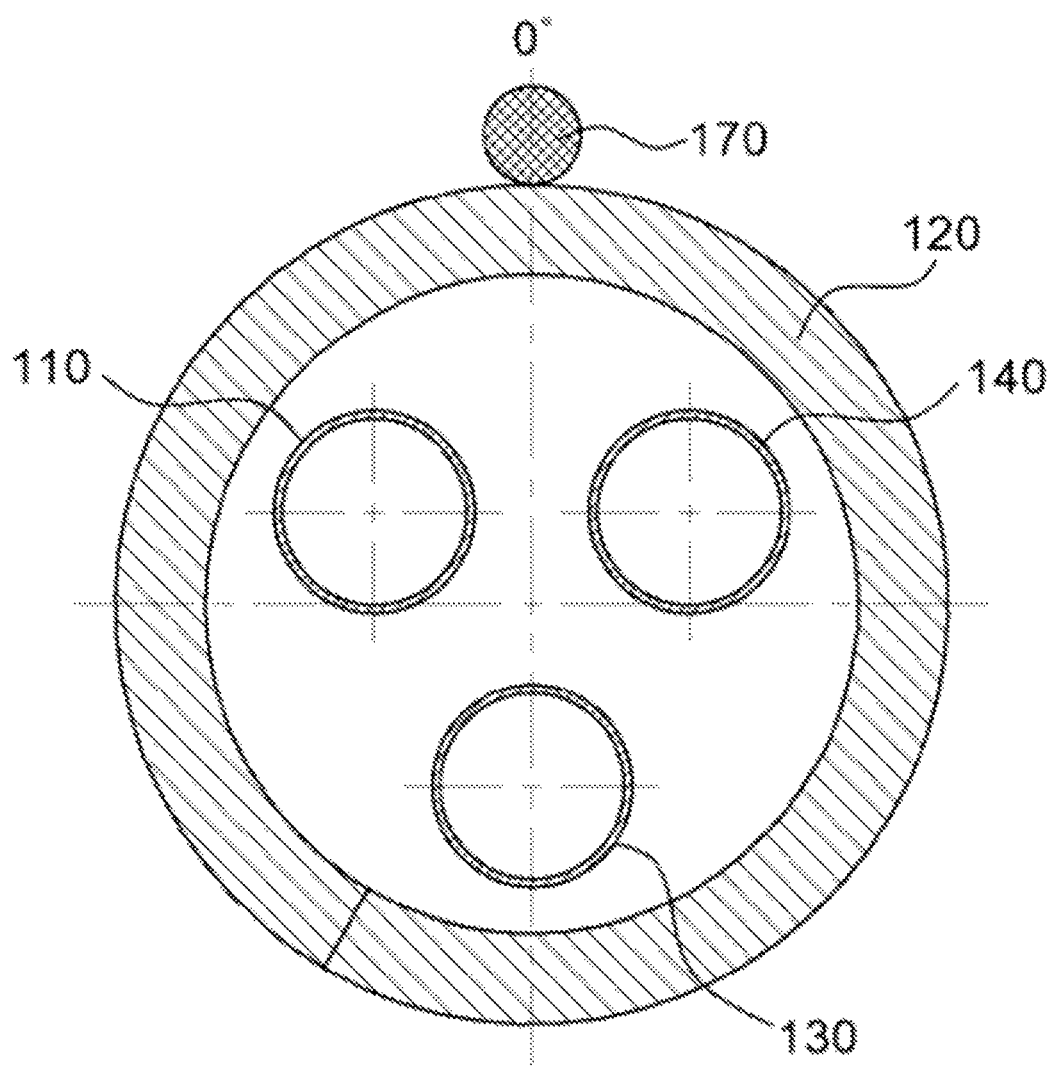
Figure 16:
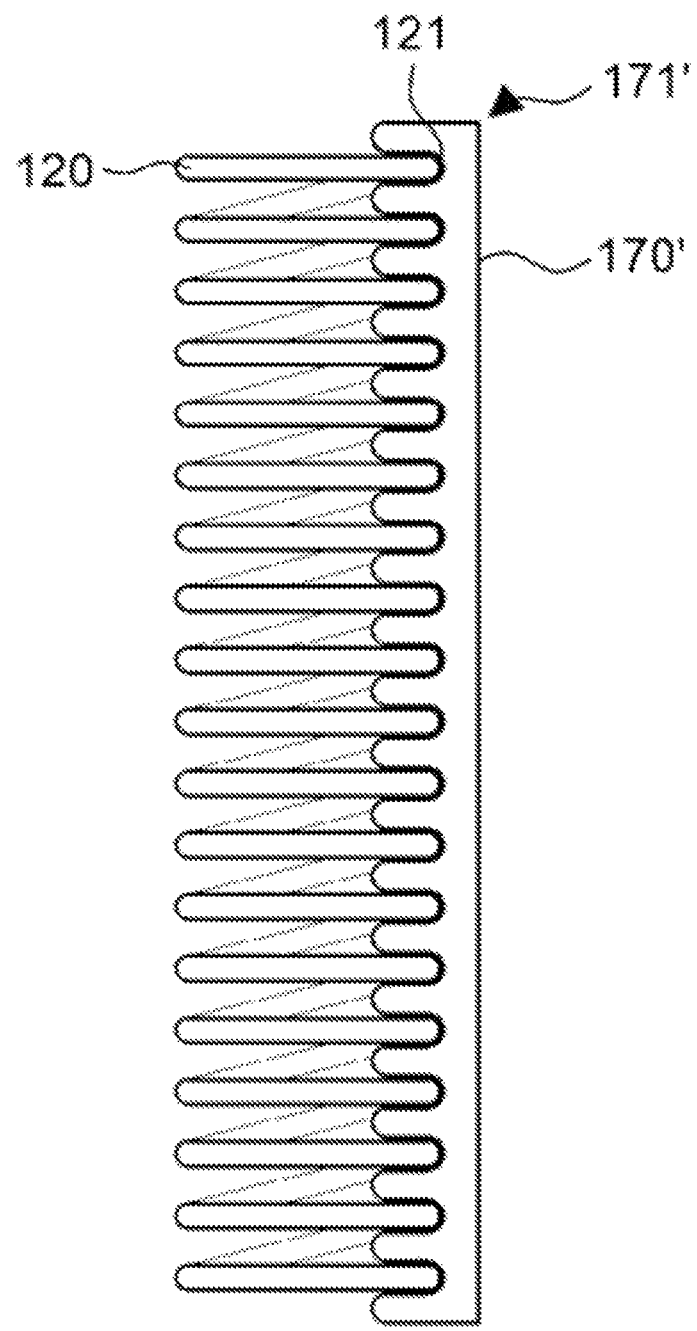
FIG. 16 is a front view illustrating another embodiment of an interval maintaining member of an underground heat exchange device of an underground heat exchange type cooling and heating system according to an embodiment of the present invention.

Referring to FIGS. 14, 15A, and 15B, the interval maintaining member 170 is disposed along the length direction of the heat exchange pipe 120 and may be coupled to at least one mountain portion 121 of the heat exchange pipe 120. For reference, the heat exchange pipe 120 encloses the supply pipe 110, the reverse pipe 130, and the return pipe 140 and may be formed with a spiral or coil structure which forms a plurality of mountain portions 121 along the length direction of the supply pipe 110, the reverse pipe 130, and the return pipe 140.

Accordingly, the interval maintaining member 170 which is coupled to the mountain portion 121 of the heat exchange pipe 120 along the length direction of the heat exchange pipe 120 maintains and supports the interval between the mountain portions 121 which are adjacent to each other along the length direction of the heat exchange pipe 120. Therefore, even though the underground heat exchange device 100 is buried in the underground, the heat exchange pipe 120 may be prevented from flowing due to the surrounding underground environment and the heat exchange efficiency of the underground heat exchange device 100 may be prevented from being degraded.

Referring to FIGS. 15A and 15B, the interval maintaining member 170 is formed with a rod shape to be attached along the plurality of mountain portions 121 of the heat exchange pipe 120. Here, the interval maintaining member 170 may be attached onto the inner circumferential surface of the spiral heat exchange pipe 120 as illustrated in FIG. 15A or attached onto the outer circumferential surface of the spiral heat exchange pipe 120 as illustrated in FIG. 15B.

Further, the interval maintaining member 170 is formed by a steel bar used as a reinforcing material to be attached to the heat exchange pipe 120 by a bonding process such as welding or fusion. However, the interval maintaining member 170 is not necessarily limited thereto, but may be modified in various shapes or structures to be attached along the plurality of mountains portions 121 of the heat exchange pipe 120 to support the spiral heat exchange pipe 120.

In the meantime, referring to FIG. 16, a concave and convex portion 171' which is coupled to at least one mountain portion 121 may be formed in the interval maintaining member 170'. For example, the concave and convex portion 171' may be formed to have a shape corresponding to at least one mountain portion. By doing this, the interval maintaining member 170' may stably support the heat exchange pipe 120.

Referring to FIG. 2 again, the underground heat exchange type cooling and heating system 1 includes a plurality of heating and cooling units 200.

The plurality of cooling and heating units 200 is configured to cool or heat an indoor space by means of a second heat medium flowing therein.

To be more specific, the plurality of cooling and heating units 200 may be formed as at least one of a cooling and heating pipe and a fan coil unit which is connected to a second transfer line 500 to be described below and cools and heats an indoor space using a second heat medium which circulates in one direction by means of the second transfer line 500 to undergo heat exchange while passing through a plurality of heat pump units 300 to be described below. For example, the cooling and heating pipe is installed on a floor of the indoor space to adjust a temperature of the floor of the indoor space like a boiler pipe. Further, the fan coil unit is configured by a heating coil or a cooling coil and a fan to suck air in an air-conditioned indoor space and exchanges heat of the air with the second heat medium having undergone heat exchange flowing through the second transfer line 500 to supply the air to the indoor space again, to control the temperature of the indoor space.

Further, the underground heat exchange type cooling and heating system 1 includes a plurality of heat pump units 300.

The plurality of heat pump units 300 allows the heat to be exchanged between the first heat medium and the second heat medium to change the second heat medium to have a setting temperature for cooling or heating and individually perform a cooling or heating operation.

To be more specific, the plurality of heat pump units 300 may simultaneously or individually perform the cooling or heating operation and include a compressor (not illustrated), a condenser (not illustrated), an expansion valve (not illustrated), an evaporator (not illustrated), a four way valve (not illustrated), and a heat medium moving line (not illustrated) therein to be subjected to compression, condensation, expansion, and evaporation processes and allows the heat to be exchanged between the first heat medium and the second heat medium using a heat medium flowing therein.

For reference, during the cooling process by the plurality of heat pump units 300, when a low temperature heat medium is injected into the compressor, the low temperature heat medium is changed to a high temperature and high pressure heat medium by the electricity and then moves to the condenser by means of the four way valve. The high temperature and high-pressure heat medium which moves to the condenser may indirectly perform the heat exchange with the first heat medium which flows through the first transfer line 400 to be described below which is disposed to pass through the condenser. The heat-exchanged first heat medium receives heat from the heat medium of the heat pump unit 300 to be changed to a high temperature state to return to the underground heat exchange device 100 again. The heat medium which exchanges the heat with the first heat medium to be cooled is vaporized while passing through the expansion valve and then moves to the evaporator to exchange the heat with the second heat medium which flows through the second transfer line 200 to cool the second heat medium. By doing this, the second heat medium which is cooled by the heat medium of the heat pump unit 300 is supplied to the plurality of cooling and heating units to cool the indoor space. In contrast, during the heating process by the plurality of heat pump units 300, when a low temperature heat medium is injected into the compressor, the low temperature heat medium is changed to a high temperature and high pressure heat medium by the electricity and then moves to the condenser by means of the four way valve. The high temperature and high-pressure heat medium which moves to the condenser exchanges heat with the second heat medium which flows through the second transfer line 500 disposed to pass through the condenser to heat the second heat medium. The heat medium which is cooled by performing the heat exchange with the second heat medium is vaporized while passing through the expansion valve and then moves to the evaporator to perform the heat exchange with the first heat medium which flows through the first transfer line 400 to be heated by a predetermined amount and then flows in the condenser again. The first heat medium which performs the heat exchange with the heat medium of the heat pump unit 300 is cooled to return to the underground heat exchange device 100. By doing this, the second heat medium which is heated by the heat medium of the heat pump unit 300 is supplied to the plurality of cooling and heating units to heat the indoor space.

The underground heat exchange type cooling and heating system 1 includes the first transfer line 400 and the second transfer line 500.

The first transfer line 400 connects the underground heat exchange device 100 to the plurality of heat pump units 300 to each other to transmit the first heat medium having undergone heat exchange in the underground heat exchange device 100 to the plurality of heat pump units 300 and transmits the first heat medium having undergone heat exchange in the plurality of heat pump units 300 to the underground heat exchange device 100.

The first transfer line 400 may include a supply pipe 410 and a manifold 420.

The supply pipe 410 is connected to the underground heat exchange device 100 to transmit the first heat medium having undergone heat exchange in the underground heat exchange device 100 at one side and return the first heat medium having undergone heat exchange in the plurality of heat pump units 300 at the other side.

The manifold 420 is branched from one side and the other side of the supply pipe 410 to transmit the first heat medium having undergone heat exchange in the underground heat exchange device 100 to the plurality of heat pump units 300 and transmit the first heat medium having undergone heat exchange in the plurality of heat pump units 300 to the supply pipe 410.

For example, a pump and a check valve which circulate the first heat medium having undergone heat exchange in one direction are installed in the manifold 420 which transmits the first heat medium having undergone heat exchange to the plurality of heat pump units 300 to control the flow of the first heat medium having undergone heat exchange which flows through the manifold 420.

Here, the first heat medium which is transmitted to the supply pipe 410 through the manifold 420 is mixed and stirred in the supply pipe 410 and then may return to the underground heat exchange device 100. Therefore, before returning the first heat medium having undergone heat exchange in the plurality of heat pump units 300 to the underground heat exchange device 100, after setting the first heat medium to have an intermediate temperature in the supply pipe 410, the heat medium returns to the underground heat exchange device 100 to improve the heat exchange efficiency of the underground heat exchange device 100.

The second transfer line 500 connects the plurality of heat pump units 300 and the plurality of cooling and heating units 200 to each other to transmit the second heat medium having undergone heat exchange in the plurality of heat pump units 300 to the plurality of cooling and heating units 200 and transmits the second heat medium discharged from the plurality of cooling and heating units 200 to the plurality of heat pump units 300. In the second transfer line 500 which transmits the second heat medium discharged from the plurality of cooling and heating units 200 to the plurality of heat pump units 300, a pump which circulates the second heat medium discharged from the plurality of cooling and heating units 200 in one direction is installed to control the flow of the second heat medium which flows through the second transfer line 500.

Accordingly, when a request for cooling or heating is transmitted from a place to use, the underground heat exchange type cooling and heating system 1 supplies the first heat medium to the underground heat exchange device 100 through the first transfer line 400 to allow the heat of the first heat medium to be exchanged and then supplies the first heat medium having undergone heat exchange to the plurality of heat pump units 300 to exchange heat with the heat medium flowing through the plurality of heat pump units 300. The second heat medium discharged from the plurality of cooling and heating units 200 through the second transfer line 500 is supplied to the plurality of heat pump units 300 to allow heat to be exchanged between the second heat medium and the heat medium having undergone heat exchange with the first heat medium of the plurality of heat pump units 300 and then supplied to the plurality of cooling and heating units 200 to allow heat to be exchanged with the heat medium of the plurality of cooling and heating units 200. By doing this, the plurality of cooling and heating units 200 may perform cooling or heating.

Hereinafter, the underground heat exchange type cooling and heating system 1 according to another embodiment of the present disclosure will be described.

For reference, for components for describing the underground heat exchange type cooling and heating system 1 according to another embodiment of the present disclosure, for the convenience of description, the same reference numerals used to describe the underground heat exchange type cooling and heating system 1 are used and the same and repeated description will be omitted.

Figure 20:
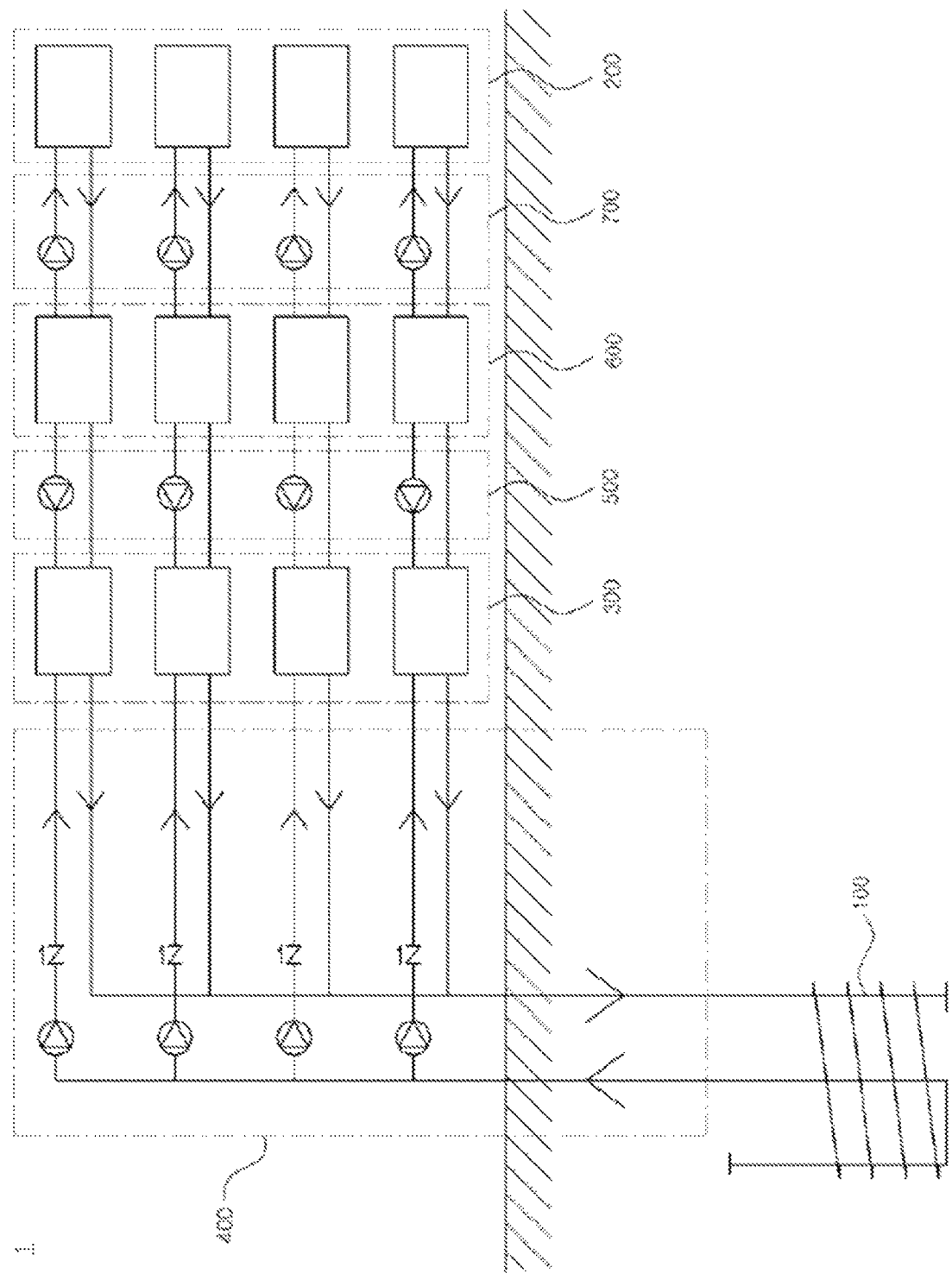
FIG. 20 is a conceptual view schematically illustrating an underground heat exchange type cooling and heating system according to another embodiment of the present invention.

FIG. 20 is a conceptual view schematically illustrating an underground heat exchange type cooling and heating system 1 according to another embodiment of the present invention.

Referring to FIG. 20, the underground heat exchange type cooling and heating system 1 according to another embodiment of the present invention includes an underground heat exchange device 100 which is buried in the ground to allow the heat to be exchanged between a first heat medium flowing therein and a geothermal heat, a plurality of cooling and heating units 200 which cools or heats an indoor space by means of a second heat medium flowing therein, and a plurality of heat pump units 300 which allows heat to be exchanged between the first heat medium and the second heat medium to change the second heat medium to have a setting temperature for cooling or heating and individually performs a cooling or heating operation.

Further, the underground heat exchange type cooling and heating system 1 according to another embodiment of the present invention includes a plurality of heat storage tanks 600.

The plurality of heat storage tanks 600 is disposed between the plurality of cooling and heating units 200 and the plurality of heat pump units 300 to store the second heat medium having undergone heat exchange in the plurality of heat pump units 300 and the second heat medium discharged from the plurality of cooling and heating units 200 therein.

That is, the plurality of heat storage tanks 600 mixes a high temperature second heat medium and a low temperature second heat medium to form an intermediate temperature to supply a second heat medium with a uniform temperature to the plurality of cooling and heating units 200 and supply a second heat medium set to have an intermediate temperature to the plurality of heat pump units 300 so that the heat exchange efficiency may be improved.

The underground heat exchange type cooling and heating system 1 according to another embodiment of the present invention includes a first transfer line 400, a second transfer line 500, and a third transfer line 700.

The first transfer line 400 transmits the first heat medium having undergone heat exchange in the underground heat exchange device 100 to the plurality of heat pump units 300 and transmits the first heat medium having undergone heat exchange in the plurality of heat pump units 300 to the underground heat exchange device 100. For example, the first transfer line 400 includes a supply pipe 410 and a manifold 420, and in the manifold 420 which transmits the first heat medium having undergone heat exchange to the plurality of heat pump units 300, a pump which circulates the first heat medium having undergone heat exchange in one direction and a check valve may be installed.

The second transfer line 500 transmits the second heat medium having undergone heat exchange in the plurality of heat pump units 300 to the plurality of heat storage tanks 600 and transmits the second heat medium stored in the plurality of heat storage tanks 600 to the plurality of heat pump units 300. For example, in the second transfer line 500 which transmits the second heat medium stored in the plurality of heat storage tanks 600 to the plurality of heat pump units 300, a pump which circulates the second heat medium in one direction may be installed.

The third transfer line 700 transmits the second heat medium stored in the plurality of heat storage pumps 600 to the plurality of cooling and heating units 200 and transmits the second heat medium discharged from the plurality of cooling and heating units 200 to the plurality of heat storage tanks 600. For example, in the third transfer line 700 which transmits the second heat medium stored in the plurality of heat storage tanks 600 to the plurality of cooling and heating units 200, a pump which circulates the second heat medium in one direction may be installed.

Accordingly, when a request for cooling or heating is transmitted from a place to use, the underground heat exchange type cooling and heating system 1 according to another embodiment of the present invention supplies the first heat medium to the underground heat exchange device 100 through the first transfer line 400 to exchange the heat of the first heat medium and then supplies the first heat medium having undergone heat exchange to the plurality of heat pump units 300 to exchange heat with the heat medium flowing through the plurality of heat pump units 300. The second heat medium discharged from the plurality of heat storage tanks 600 through the second transfer line 500 is supplied to the plurality of heat pump units 300 to allow heat to be exchanged between the second heat medium and the heat medium of the plurality of heat pump units 300 which exchanges heat with the first heat medium and then supplied to the plurality of heat storage tanks 600 again to be stored. The second heat medium stored in the plurality of heat storage pumps 600 is supplied to the plurality of cooling and heating units 200 through the third transfer line 700 to allow heat to be exchanged between the second heat medium and the heat medium of the plurality of cooling and heating units 200, and then the second heat medium discharged from the plurality of cooling and heating units 200 is supplied to the plurality of heat storage tanks 600 to be stored. By doing this, the plurality of cooling and heating units 200 may perform cooling or heating.

Hereinafter, the underground heat exchange type cooling and heating system 1 according to still another embodiment of the present disclosure will be described.

For reference, for components for describing the underground heat exchange type cooling and heating system 1 according to still another embodiment of the present disclosure, for the convenience of description, the same reference numerals used to describe the underground heat exchange type cooling and heating system 1 are used and the same and repeated description will be omitted.

Figure 21:
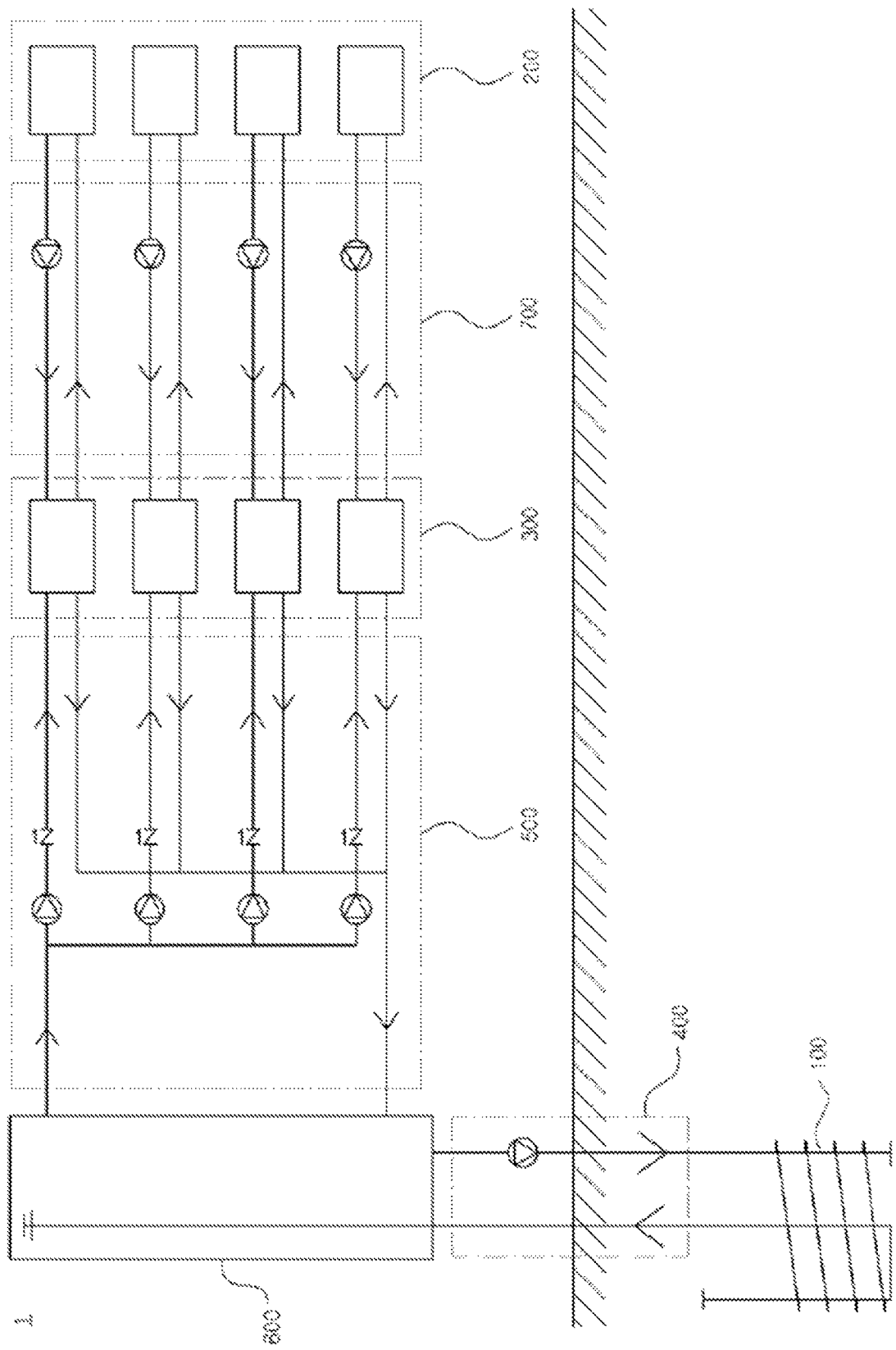
FIGS. 21 and 22 are conceptual views schematically illustrating an underground heat exchange type cooling and heating system according to still another embodiment of the present invention.
Figure 22:
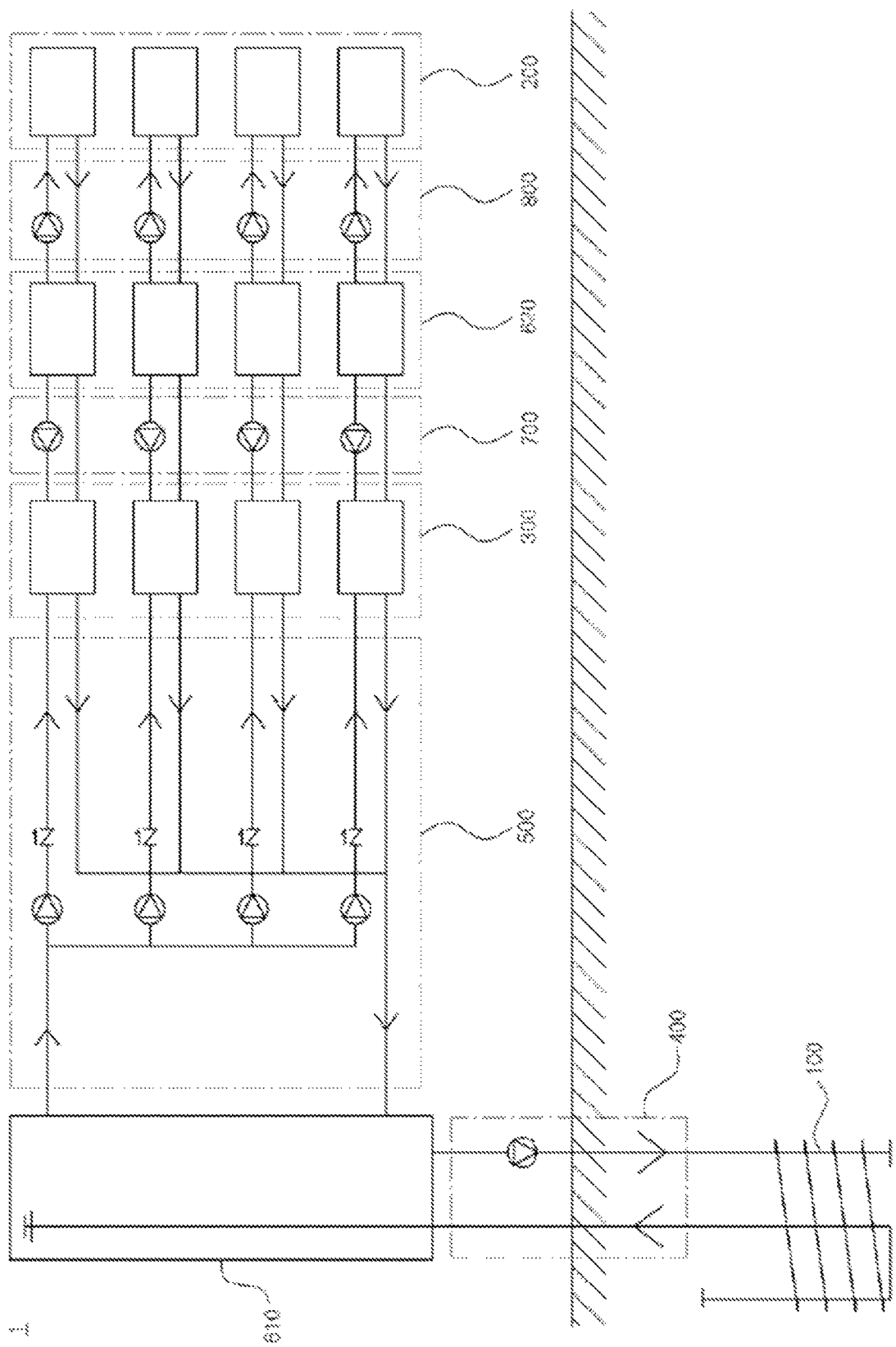

FIGS. 21 and 22 are conceptual views schematically illustrating an underground heat exchange type cooling and heating system 1 according to still another embodiment of the present invention.

Referring to FIG. 21, the underground heat exchange type cooling and heating system 1 according to still another embodiment of the present invention includes an underground heat exchange device 100 which is buried in the underground to allow heat to be exchanged between a first heat medium flowing therein and a geothermal heat, a plurality of cooling and heating units 200 which cools or heats an indoor space by means of a second heat medium flowing therein, and a plurality of heat pump units 300 which allows heat to be exchanged between the first heat medium and the second heat medium to change the second heat medium to have a setting temperature for cooling or heating and individually performs a cooling or heating operation.

Further, the underground heat exchange type cooling and heating system 1 according to still another embodiment of the present invention includes a heat storage tank 600.

A single heat storage tank 600 is disposed between the underground heat exchange device 100 and the plurality of heat pump units 300 to store the first heat medium having undergone heat exchange in the underground heat exchange device 100 therein to supply the first heat medium to the plurality of heat pump units 300 and store the first heat medium having undergone heat exchange in the plurality of heat pump units 300 to supply the first heat medium to the underground heat exchange device 100. Accordingly, the heat storage tank 600 mixes a high temperature first heat medium and a low temperature first heat medium to form an intermediate temperature to supply a first heat medium with a uniform temperature to the plurality of heat pump units 300 and also supply a first heat medium set to have an intermediate temperature to the underground heat exchange device 100 so that the heat exchange efficiency may be improved. In this case, in the heat storage tank 600, the first heat medium having undergone heat exchange in the underground heat exchange device 100 upwardly flows to be stored and the first heat medium having undergone heat exchange in the plurality of heat pump units 300 downwardly flows to be stored. For example, the first heat medium having undergone heat exchange in the underground heat exchange device 100 upwardly flows in the single heat storage tank 600 by means of a diffuser equipped in the heat storage tank 600 to be stored.

The underground heat exchange type cooling and heating system 1 according to still another embodiment of the present invention includes a first transfer line 400, a second transfer line 500, and a third transfer line 700.

The first transfer line 400 is connected to the diffuser equipped in the heat storage tank 600 to transmit the first heat medium having undergone heat exchange in the underground heat exchange device 100 to an upper portion of the heat storage tank 600 and is connected to a lower portion of the heat storage tank 600 to transmit the first heat medium which flows into a lower portion of the heat storage tank 600 from the plurality of heat pump units 300 to be stored, to the underground heat exchange device 100. For example, a pump which circulates the first heat medium in one direction may be installed in the first transfer line 400.

The second transfer line 500 transmits the first heat medium which flows into the upper portion of the heat storage tank 600 to be stored, to the plurality of heat pump units 300, through the diffuser connected to the first transfer line 400 and transmits the first heat medium having undergone heat exchange in the plurality of heat pump units 300 into the lower portion of the heat storage tank 600. For example, the second transfer line 500 may include a supply pipe and a manifold at a side which transmits the first heat medium flowing into the upper portion of the heat storage tank 600 to be stored, to the plurality of heat pumps units 300, and at a side which transmits the first heat medium having undergone heat exchange in the plurality of heat pump units 300 to the lower portion of the heat storage tank 600. In the second transfer line 500, a pump which circulates the first heat medium in one direction and a check valve may be installed in the manifold at a side which transmits the first heat medium which flows into the upper portion of the heat storage tank 600 to be stored to the plurality of heat pump units 300. Further, in the second transfer line 500, the first heat medium which is transmitted to the supply pipe through a manifold at a side which transmits the first heat medium having undergone heat exchange in the plurality of heat pump units 300 to a lower portion of the heat storage tank 600 is mixed in the supply pipe to be stirred and then returns to the heat storage tank 600. Therefore, the first heat medium having undergone heat exchange in the plurality of heat pump units 300 is transmitted to the supply pipe through the manifold to be mixed and is primarily set to have an intermediate temperature and then supplied to the heat storage tank 600 to be stored and secondarily set to have an intermediate temperature to be supplied to the underground heat exchange device 100. Therefore, the heat exchange efficiency of the underground heat exchange device 100 will be improved.

The third transfer line 700 connects the plurality of heat pump units 300 and the plurality of cooling and heating units 200 to each other to transmit the second heat medium having undergone heat exchange in the plurality of heat pump units 300 to the plurality of cooling and heating units 200 and transmits the second heat medium discharged from the plurality of cooling and heating units 200 to the plurality of heat pump units 300. For example, in the third transfer line 700 which transmits the second heat medium discharged from the plurality of cooling and heating units 200 to the plurality of heat pump units 300, a pump which circulates the second heat medium discharged from the plurality of cooling and heating units 200 in one direction may be installed.

Accordingly, when a request for cooling or heating is transmitted from a place to use, the underground heat exchange type cooling and heating system 1 supplies the first heat medium stored in the lower portion of the heat storage tank 600 to the underground heat exchange device 100 through the first transfer line 400 to exchange the heat of the first heat medium and then supplies the first heat medium having undergone heat exchange to the upper portion of the heat storage tank 600 to mix the high temperature first heat medium stored in the heat storage tank 600 and a low temperature first heat medium to form an intermediate temperature, thereby forming a first heat medium with a uniform temperature. Further, the first heat medium set to have an intermediate temperature is supplied to the plurality of heat pump units 300 through the second transfer line 500 to allow heat to be exchanged between the first heat medium and a heat medium flowing through the plurality of heat pump units 300, and the first heat medium having undergone heat exchange in the plurality of heat pump units 300 returns and is stirred to set to have an intermediate temperature and then returns to the heat storage tank 600. Further, the second heat medium discharged from the plurality of cooling and heating units 200 through the third transfer line 700 is supplied to the plurality of heat pump units 300 to allow heat to be exchanged between the second heat medium and the heat medium of the plurality of heat pump units 300 having undergone heat exchange with the first heat medium and then supplied to the plurality of cooling and heating units 200 to allow heat to be exchanged between the second heat medium and the heat medium of the plurality of cooling and heating units 200. By doing this, the plurality of cooling and heating units 200 may perform cooling or heating.

Referring to FIG. 22, the underground heat exchange type cooling and heating system 1 according to still another embodiment of the present invention includes an underground heat exchange device 100 which is buried in the ground to allow heat to be exchanged between a first heat medium flowing therein and a geothermal heat, a plurality of cooling and heating units 200 which cools or heats an indoor space by means of a second heat medium flowing therein, and a plurality of heat pump units 300 which allows heat to be exchanged between the first heat medium and the second heat medium to change the second heat medium to have a setting temperature for cooling or heating and individually performs a cooling or heating operation.

Further, the underground heat exchange type cooling and heating system 1 according to still another embodiment of the present invention includes a first heat storage tank 610.

A single first heat storage tank 610 is disposed between the underground heat exchange device 100 and the plurality of heat pump units 300 to store the first heat medium having undergone heat exchange in the underground heat exchange device 100 therein to supply the first heat medium to the plurality of heat pump units 300 and store the first heat medium having undergone heat exchange in the plurality of heat pump units 300 therein to supply the first heat medium to the underground heat exchange device 100. Accordingly, the first heat storage tank 610 mixes a high temperature first heat medium and a low temperature first heat medium to form an intermediate temperature to supply a first heat medium with a uniform temperature to the plurality of heat pump units 300 and also supply a first heat medium set to have an intermediate temperature to the underground heat exchange device 100 so that the heat exchange efficiency may be improved. In this case, in the first heat storage tank 610, the first heat medium having undergone heat exchange in the underground heat exchange device 100 upwardly flows to be stored and the first heat exchange having undergone heat exchange in the plurality of heat pump units 300 downwardly flows to be stored. For example, the first heat medium having undergone heat exchange in the underground heat exchange device 100 upwardly flows in the single heat storage tank 600 by means of a diffuser equipped in the first heat storage tank 610 to be stored.

Further, the underground heat exchange type cooling and heating system 1 according to still another embodiment of the present invention includes a plurality of second heat storage tank 620.

The plurality of second heat storage tanks 620 is disposed between the plurality of cooling and heating units 200 and the plurality of heat pump units 300 to store the second heat medium having undergone heat exchange in the plurality of heat pump units 300 and the second heat medium discharged from the plurality of cooling and heating units 200 therein.

That is, the plurality of second heat storage tanks 620 mixes a high temperature second heat medium and a low temperature second heat medium to form an intermediate temperature to supply a second heat medium with a uniform temperature to the plurality of cooling and heating units 200 and also supply a second heat medium set to have an intermediate temperature to the plurality of heat pump units 300 so that the heat exchange efficiency may be improved.

The underground heat exchange type cooling and heating system 1 according to still another embodiment of the present invention includes a first transfer line 400, a second transfer line 500, a third transfer line 700, and a fourth transfer line 800.

The first transfer line 400 is connected to the diffuser equipped in the first heat storage tank 610 to transmit the first heat medium having undergone heat exchange in the underground heat exchange device 100 to an upper portion of the first heat storage tank 610 and is connected to a lower portion of the first heat storage tank 610 to transmit the first heat medium which flows into a lower portion of the first heat storage tank 610 from the plurality of heat pump units 300 to be stored, to the underground heat exchange device 100. For example, a pump which circulates the first heat medium in one direction may be installed in the first transfer line 400.

The second transfer line 500 transmits the first heat medium which flows into the upper portion of the first heat storage tank 610 to be stored through the diffuser connected to the first transfer line 400, to the plurality of heat pump units 300 and transmits the first heat medium having undergone heat exchange in the plurality of heat pump units 300 to the lower portion of the first heat storage tank 610. For example, the second transfer line 500 may include a supply pipe and a manifold at a side which transmits the first heat medium flowing into the upper portion of the first heat storage tank 610 to be stored to the plurality of heat pumps units 300 and at a side which transmits the first heat medium having undergone heat exchange in the plurality of heat pump units 300 to the lower portion of the first heat storage tank 610. In the second transfer line 500, a pump which circulates the first heat medium in one direction and a check valve may be installed in the manifold at a side which transmits the first heat medium which flows into the upper portion of the first heat storage tank 610 to be stored, to the plurality of heat pump units 300. Further, in the second transfer line 500, the first heat medium which is transmitted to the supply pipe through a manifold at a side which transmits the first heat medium having undergone heat exchange in the plurality of heat pump units 300 to a lower portion of the first heat storage tank 610 is mixed in the supply pipe to be stirred and then returns to the first heat storage tank 610. Therefore, the first heat medium having undergone heat exchange in the plurality of heat pump units 300 is transmitted to the supply pipe through the manifold to be mixed and is primarily set to have an intermediate temperature and then supplied to the first heat storage tank 610 to be stored and secondarily set to have an intermediate temperature to be supplied to the underground heat exchange device 100. Therefore, the heat exchange efficiency of the underground heat exchange device 100 will be improved.

The third transfer line 700 transmits the second heat medium having undergone heat exchange in the plurality of heat pump units 300 to the plurality of second heat storage tanks 620 and transmits the second heat medium stored in the plurality of second heat storage tanks 620 to the plurality of heat pump units 300. For example, in the third transfer line 700 which transmits the second heat medium stored in the plurality of second heat storage tanks 620 to the plurality of heat pump units 300, a pump which circulates the second heat medium in one direction may be installed.

The fourth transfer line 800 transmits the second heat medium stored in the plurality of second heat storage tanks 620 to the plurality of cooling and heating units 200 and transmits the second heat medium discharged from the plurality of cooling and heating units 200 to the plurality of second heat storage tanks 620. For example, in the fourth transfer line 800 which transmits the second heat medium stored in the plurality of second heat storage tanks 620 to the plurality of cooling and heating units 200, a pump which circulates the second heat medium in one direction may be installed.

Accordingly, when a request for cooling or heating is transmitted from a place to use, the underground heat exchange type cooling and heating system 1 supplies the first heat medium stored in the lower portion of the first heat storage tank 610 to the underground heat exchange device 100 through the first transfer line 400 to allow the heat of the first heat medium to be exchanged and then supplies the first heat medium having undergone heat exchange to the upper portion of the first heat storage tank 610 to mix the high temperature first heat medium stored in the heat storage tank 600 and a low temperature first heat medium to form an intermediate temperature, thereby forming a first heat medium with a uniform temperature. Further, the first heat medium set to have an intermediate temperature is supplied to the plurality of heat pump units 300 through the second transfer line 500 to allow heat to be exchanged with a heat medium flowing through the plurality of heat pump units 300, and the first heat medium having undergone heat exchange in the plurality of heat pump units 300 returns and is stirred to set to have an intermediate temperature and then returns to the first heat storage tank 610. The second heat medium discharged from the plurality of second heat storage tanks 620 through the third transfer line 700 is supplied to the plurality of heat pump units 300 to allow heat to be exchanged between the second heat medium and the heat medium of the plurality of heat pump units 300 having undergone heat exchange with the first heat medium and then is supplied to the plurality of second heat storage tanks 620 again to be stored. Through the fourth transfer line 800, the second heat medium stored in the plurality of second heat storage pumps 620 is supplied to the plurality of cooling and heating units 200 to allow the heat to be exchanged between the second heat medium and the heat medium of the plurality of cooling and heating units 200 and the second heat medium discharged from the plurality of cooling and heating units 200 is supplied to the plurality of second heat storage tanks 620 to be stored. By doing this, the plurality of cooling and heating units 200 may perform cooling or heating.

As described above, according to the embodiment of the present invention, the second heat medium which is supplied to the plurality of cooling and heating units 200 is changed to a setting temperature using the first heat medium having undergone heat exchange by the underground heat exchange device 100 and is individually supplied to the plurality of cooling and heating units 200 to cool or heat an indoor space, thereby easily changing cooling and heating and significantly improving an energy efficiency as compared with the existing cooling and heating device using fossil fuel or the cooling heating device using electricity. Therefore, the cooling and heating costs may be saved.

The first heat medium exchanges heat by the underground heat exchange device 100 including the supply pipe 110, the return pipe 140, the reverse pipe 130, and the spiral heat exchange pipe 120 to increase a heat exchange area of the first heat medium, thereby improving a heat exchange efficiency.

Further, the underground heat exchange device 100 is configured as a module so that the convenience for carrying and installing the device is improved and the device may be partially replaced to allow easy maintenance and allow cost saving.

Further, the underground heat exchange device which is formed as a module may be selectively extended or reduced in accordance with the environment of the buried area and the capacity of the cooling and heating system, to increase applicability and usability.

Furthermore, the interval maintaining member 170 is coupled to the heat exchange pipe 120 to space apart the mountain portions 121 of the heat exchange pipe 120 which is configured to have a spiral shape or a coil shape with a predetermined interval therebetween so that the mechanical stability of the heat exchange pipe 120 is improved. Therefore, by improving the mechanical stability of the heat exchange pipe 120, even though the underground heat exchange device 100 is buried under the ground, the deformation or the damage of the heat exchange pipe 120 due to the surrounding underground environment may be prevented and the degradation of the heat exchange efficiency may be prevented.

The exemplary embodiments of the present invention have been illustrated and described above, but the present invention is not limited to the above-described specific embodiment, it is obvious d that various modification may be made by those skilled in the art, to which the present invention pertains without departing from the gist of the present invention, which is claimed in the claims, and such modified embodiments should not be individually understood from the technical spirit or prospect of the present invention.

INDUSTRIAL APPLICABILITY

The underground heat exchange type cooling and heating system according to the present embodiment may be used throughout the eco-friendly alternative energy industry which replaces the fossil fuel.

What is claimed is:

1. An underground heat exchange system, comprising:
an underground heat exchange device which is buried under the ground to allow heat to be exchanged between a first heat medium flowing in the underground heat exchange device and a geothermal heat;
a plurality of cooling and heating units which cools or heats an indoor space by means of a second heat medium flowing in the plurality of cooling and heating units;
a plurality of heat pump units which allows heat to be exchanged between the first heat medium and the second heat medium to change the second heat medium to have a setting temperature for cooling or heating and individually performs a cooling or heating operation;
a first transfer circuit which transmits the first heat medium having undergone heat exchange in the underground heat exchange device to the plurality of heat pump units and transmits the first heat medium having undergone heat exchange in the plurality of heat pump units to the underground heat exchange device; and
a second transfer circuit which transmits the second heat medium having undergone heat exchange in the plurality of heat pump units to the plurality of cooling and heating units and transmits the second heat medium discharged from the plurality of cooling and heating units to the plurality of heat pump units,
wherein the underground heat exchange device includes:
a supply pipe which is connected to the first transfer circuit to supply the first heat medium from the outside to the underground;
a reverse pipe which collects and passes the first heat medium having undergone heat exchange;
a heat exchange pipe which is spirally formed to have at least one mountain portion along a length direction of the supply pipe to connect the supply pipe and the reverse pipe to each other and guide a movement of the first heat medium supplied through the supply pipe to exchange heat of the first heat medium to flow the first heat medium into the reverse pipe;
a return pipe which is connected to the reverse pipe and the first transfer circuit to discharge the first heat medium having undergone heat exchange from the underground to the outside; and
an interval maintaining member which is disposed along a length direction of the heat exchange pipe and is coupled to the at least one mountain portion, and
the heat exchange pipe is disposed around the supply pipe, the return pipe, and the reverse pipe to enclose the supply pipe, the return pipe, and the reverse pipe, the heat exchange pipe is disposed along an axial direction of the supply pipe; and the first heat medium which flows into the supply pipe through the first transfer circuit simultaneously passes through the supply pipe and the heat exchange pipe to undergo heat exchange and then flows into the reverse pipe, and the first heat medium flowing into the reverse pipe flows out to the first transfer circuit through the return pipe.

2. The underground heat exchange system of claim 1, wherein the heat exchange pipe is formed to have a plurality of mountain portions, and wherein the interval maintaining member maintains a predetermined interval between any two mountain portions of the plurality of mountain portions.

3. The underground heat exchange system of claim 1, wherein the interval maintaining member is formed to have a rod shape and attached on an inner circumferential surface or an outer circumferential surface of the heat exchange pipe along the length direction of the heat exchange pipe.

4. The underground heat exchange system of claim 1, wherein the interval maintaining member includes a concave and convex portion formed to have a shape corresponding to the at least one mountain portion to be coupled to the at least one mountain portion.

5. The underground heat exchange system of claim 1, wherein the underground heat exchange device includes:
- a transfer module which supplies the first heat medium having undergone heat exchange in the plurality of heat pump units to an underground direction and returns the first heat medium having undergone heat exchange in the underground to the first transfer circuit;
- a heat exchange module which performs heat exchange of the first heat medium supplied from the transfer module and then transmits the first heat medium having undergone heat exchange to the transfer module; and
- at least one return module which changes the flow of the first heat medium having undergone heat exchange while passing through the heat exchange module and transmits the first heat medium to the heat exchange module, and
- wherein the transfer module, the heat exchange module, and the at least one return module are sequentially disposed along one direction and are connected to each other through at least one of a flange and a socket.

6. The underground heat exchange system of claim 1, wherein the plurality of cooling and heating units is formed by at least one of a cooling and heating pipe and a fan coil unit connected to the second transfer circuit.

7. The underground heat exchange system of claim 1, wherein the first transfer circuit includes:
- a supply pipe which is connected to the underground heat exchange device to transmit the first heat medium having undergone heat exchange in the underground heat exchange device at one side and return the first heat medium having undergone heat exchange in the plurality of heat pump units at another side; and
- a manifold which is respectively branched from the one side of the supply pipe and the another side of the supply pipe to transmit the first heat medium having undergone heat exchange in the underground heat exchange device to the plurality of heat pump units and transmit the first heat medium having undergone heat exchange in the plurality of heat pump units to the supply pipe, and
- the first heat medium which is transmitted to the supply pipe through the manifold is mixed in the supply pipe to be stirred to return to the underground heat exchange device.

8. An underground heat exchange type cooling and heating system, comprising:
- an underground heat exchange device which is buried under the ground to allow heat to be exchanged between a first heat medium flowing in the underground heat exchange device and a geothermal heat;
- a plurality of cooling and heating units which cools or heats an indoor space by means of a second heat medium flowing in the plurality of cooling and heating units;
- a plurality of heat pump units which allows heat to be exchanged between the first heat medium and the second heat medium to change the second heat medium to have a setting temperature for cooling or heating and individually performs a cooling or heating operation;
- a plurality of heat storage tanks which stores the second heat medium having undergone heat exchange in the plurality of heat pump units and the second heat medium discharged from the plurality of cooling and heating units;
- a first transfer circuit which transmits the first heat medium having undergone heat exchange in the underground heat exchange device to the plurality of heat pump units and transmits the first heat medium having undergone heat exchange in the plurality of heat pump units to the underground heat exchange device;
- a second transfer circuit which transmits the second heat medium having undergone heat exchange in the plurality of heat pump units to the plurality of heat storage tanks and transmits the second heat medium stored in the plurality of heat storage tanks to the plurality of heat pump units; and
- a third transfer circuit which transmits the second heat medium stored in the plurality of heat storage tanks to the plurality of cooling and heating units and transmits the second heat medium discharged from the plurality of cooling and heating units to the plurality of heat storage tanks,
- wherein the underground heat exchange device includes:
- a supply pipe which is connected to the first transfer circuit to supply the first heat medium from the outside to the underground;
- a reverse pipe which collects and passes the first heat medium having undergone heat exchange;
- a heat exchange pipe which is spirally formed to have at least one mountain portion along a length direction of the supply pipe to connect the supply pipe and the reverse pipe to each other and guide a movement of the first heat medium supplied through the supply pipe to exchange heat of the first heat medium to flow the first heat medium into the reverse pipe;
- a return pipe which is connected to the reverse pipe and the first transfer circuit to discharge the first heat medium having undergone heat exchange from the underground to the outside; and
- an interval maintaining member which is disposed along a length direction of the heat exchange pipe and is coupled to the at least one mountain portion, and the heat exchange pipe is disposed around the supply pipe, the return pipe, and the reverse pipe to enclose the supply pipe, the return pipe, and the reverse pipe, the heat exchange pipe is disposed along an axial direction of the supply pipe; and the first heat medium which flows into the supply pipe through the first transfer circuit simultaneously passes through the supply pipe and the heat exchange pipe to undergo heat exchange and then flows into the reverse pipe, and the first heat medium flowing into the reverse pipe flows out to the first transfer circuit through the return pipe.

9. An underground heat exchange system, comprising:
- an underground heat exchange device which is buried under the ground to allow heat to be exchanged between a first heat medium flowing in the underground heat exchange device and a geothermal heat;
- a plurality of cooling and heating units which cools or heats an indoor space by means of a second heat medium flowing in the plurality of cooling and heating units;
- a plurality of heat pump units which allows heat to be exchanged between the first heat medium and the second heat medium to change the second heat medium to have a setting temperature for cooling or heating and individually performs a cooling or heating operation;
- a heat storage tank in which the first heat medium having undergone heat exchange in the underground heat exchange device flows into an upper side to be stored and the first heat medium having undergone heat exchange in the plurality of heat pump units flows into a lower side to be stored;

a first transfer circuit which transmits the first heat medium having undergone heat exchange in the underground heat exchange device into the upper side of the heat storage tank and transmits the first heat medium which flows into the lower side of the heat storage tank to be stored, to the underground heat exchange device;

a second transfer circuit which transmits the first heat medium flowing into the upper side of the heat storage tank to be stored, to the plurality of heat pump units, and transmits the first heat medium having undergone heat exchange in the plurality of heat pump units into the lower side of the heat storage tank; and a third transfer circuit which transmits the second heat medium having undergone heat exchange in the plurality of heat pump units to the plurality of cooling and heating units and transmits the second heat medium discharged from the plurality of cooling and heating units to the plurality of heat pump units, wherein the underground heat exchange device includes:

a supply pipe which is connected to the first transfer circuit to supply the first heat medium from the outside to the underground;

a reverse pipe which collects and passes the first heat medium having undergone heat exchange;

a heat exchange pipe which is spirally formed to have at least one mountain portion along a length direction of the supply pipe to connect the supply pipe and the reverse pipe to each other and guide a movement of the first heat medium supplied through the supply pipe to exchange heat of the first heat medium to flow the first heat medium into the reverse pipe;

a return pipe which is connected to the reverse pipe and the first transfer circuit to discharge the first heat medium having undergone heat exchange from the underground to the outside; and an interval maintaining member which is disposed along a length direction of the heat exchange pipe and is coupled to the at least one mountain portion, and the heat exchange pipe is disposed around the supply pipe, the return pipe, and the reverse pipe to enclose the supply pipe, the return pipe, and the reverse pipe, the heat exchange pipe is disposed along an axial direction of the supply pipe; and the first heat medium which flows into the supply pipe through the first transfer circuit simultaneously passes through the supply pipe and the heat exchange pipe to undergo heat exchange and then flows into the reverse pipe, and the first heat medium flowing into the reverse pipe flows out to the first transfer circuit through the return pipe.

* * * * *